US011603090B2

(12) United States Patent
Matsubara et al.

(10) Patent No.: US 11,603,090 B2
(45) Date of Patent: Mar. 14, 2023

(54) CONTROL DEVICE FOR VEHICLE

(71) Applicants: TOYOTA JIDOSHA KABUSHIKI KAISHA, Toyota (JP); AISIN CORPORATION, Kariya (JP)

(72) Inventors: Keigo Matsubara, Nagoya (JP); Masayuki Baba, Toyota (JP); Tomoya Inayoshi, Anjo (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 0 days.

(21) Appl. No.: 17/460,765

(22) Filed: Aug. 30, 2021

(65) Prior Publication Data

US 2022/0097678 A1    Mar. 31, 2022

(30) Foreign Application Priority Data

Sep. 30, 2020 (JP) .............................. JP2020-166514

(51) Int. Cl.
  *B60W 20/40* (2016.01)
  *B60W 10/06* (2006.01)
  (Continued)

(52) U.S. Cl.
  CPC ............ *B60W 20/40* (2013.01); *B60K 6/387* (2013.01); *B60K 6/48* (2013.01); *B60W 10/02* (2013.01);
  (Continued)

(58) Field of Classification Search
  CPC ...... B60W 10/02; B60W 10/06; B60W 10/08; B60W 20/40; B60W 2510/244;
  (Continued)

(56) References Cited

U.S. PATENT DOCUMENTS 8,864,623 B2 * 10/2014 Doering ................ B60W 10/06
                                                           477/70
9,139,077 B2 *  9/2015 Yoshikawa ........... B60W 20/00
                       (Continued)

FOREIGN PATENT DOCUMENTS

JP      2015-051728 A     3/2015
JP      2018-030507 A     3/2018

OTHER PUBLICATIONS

U.S. Appl. No. 17/493,142, filed Oct. 4, 2021 in the name of Keigo Matsubara et al.

*Primary Examiner* — Carl C Staubach
(74) *Attorney, Agent, or Firm* — Oliff PLC

(57) ABSTRACT

A control device, for a vehicle, comprising an electronic control unit configured to: output a first command value, for tightening a pack clearance, to a hydraulic control circuit system prior to output of a second command value, for transmitting cranking torque that raises a rotation speed of the engine, during a transition of switching a control state of a clutch from a released state to an engaged state when an engine is started; and perform, when the engine is started, first control for outputting the cranking torque by an electric motor and second control for starting operation of the engine, wherein the electronic control unit is configured to set the first command value to a first hydraulic pressure when the engine is started in a first situation, and set the first command value to a higher second hydraulic pressure higher when the engine is started in a second situation.

10 Claims, 7 Drawing Sheets

(51) Int. Cl.
*B60W 10/08* (2006.01)
*B60K 6/48* (2007.10)
*B60K 6/387* (2007.10)
*B60W 10/02* (2006.01)

(52) U.S. Cl.
CPC ............ *B60W 10/06* (2013.01); *B60W 10/08* (2013.01); *B60K 2006/4825* (2013.01)

(58) Field of Classification Search
CPC ....... B60W 2540/10; B60W 2710/023; B60W 2710/027; B60W 2710/0644; B60W 2710/083
See application file for complete search history.

(56) References Cited

U.S. PATENT DOCUMENTS

| | | | |
|---|---|---|---|
| 9,969,395 B1* | 5/2018 | Dlugoss | B60W 30/18 |
| 2007/0179695 A1* | 8/2007 | Reinke | B60W 10/06 |
| | | | 701/54 |
| 2009/0264249 A1* | 10/2009 | Gloge | B60K 6/48 |
| | | | 477/3 |
| 2013/0331228 A1* | 12/2013 | Miyazaki | B60W 30/20 |
| | | | 903/902 |
| 2014/0172213 A1* | 6/2014 | Park | B60W 10/02 |
| | | | 903/930 |
| 2022/0097679 A1* | 3/2022 | Matsubara | B60K 6/24 |
| 2022/0097680 A1* | 3/2022 | Matsubara | B60K 6/26 |
| 2022/0111719 A1* | 4/2022 | Matsubara | B60K 6/48 |
| 2022/0227218 A1* | 7/2022 | Matsubara | F16H 61/0009 |

* cited by examiner

FIG. 3

K0 CONTROL PHASE DEFINITION

| NAME OF PHASE | DEFINITION OF STATE |
|---|---|
| K0 STANDBY | STANDBY WITHOUT STARTING K0 CONTROL AT START |
| QUICK APPLY | TEMPORARILY APPLY HIGH HYDRAULIC PRESSURE TO QUICKLY COMPLETE PACKING AND IMPROVE INITIAL RESPONSIVENESS OF HYDRAULIC PRESSURE |
| CONSTANT PRESSURE STANDBY AT TIME OF PACKING | STANDBY AT CONSTANT PRESSURE TO COMPLETE PACKING |
| K0 CRANKING | CRANK ENGINE BY K0 CLUTCH |
| QUICK DRAIN | TEMPORARILY OUTPUT LOW HYDRAULIC PRESSURE SO THAT PACK END PRESSURE CAN BE QUICKLY MADE TO STANDBY TO IMPROVE INITIAL RESPONSIVENESS OF HYDRAULIC PRESSURE |
| CONSTANT PRESSURE STANDBY BEFORE RE-ENGAGEMENT | STANDBY AT PREDETERMINED TORQUE SO AS NOT TO DISTURB COMPLETE COMBUSTION OF ENGINE |
| INITIAL ROTATION SYNCHRONIZATION | CONTROL K0 TORQUE TO ASSIST INCREASE IN ENGINE ROTATION SPEED IN ORDER TO QUICKLY SYNCHRONIZE ENGINE ROTATION SPEED AND MG ROTATION SPEED |
| INTERMEDIATE ROTATION SYNCHRONIZATION | CONTROL K0 TORQUE SO THAT ENGINE HAS APPROPRIATE BLOWING AMOUNT |
| END ROTATION SYNCHRONIZATION | CONTROL K0 TORQUE TO SYNCHRONIZE ENGINE ROTATION SPEED AND MG ROTATION SPEED |
| ENGAGEMENT TRANSITION SWEEP | BRING K0 CLUTCH INTO ENGAGED STATE |
| FULL ENGAGEMENT TRANSITION SWEEP | BRING K0 CLUTCH INTO FULLY ENGAGED STATE (INCREASE K0 TORQUE TO STATE IN WHICH SAFETY FACTOR THAT CAN GUARANTEE ENGAGEMENT IS APPLIED) |
| FULL ENGAGEMENT | MAINTAIN K0 CLUTCH IN FULLY ENGAGED STATE |
| BACKUP SWEEP | ENGAGE K0 CLUTCH (BACKUP CONTROL) |
| CALCULATION STOP | STOP CALCULATION OF TORQUE AND HYDRAULIC PRESSURE WHILE FAIL-SAFE CONTROL IS BEING EXECUTED |

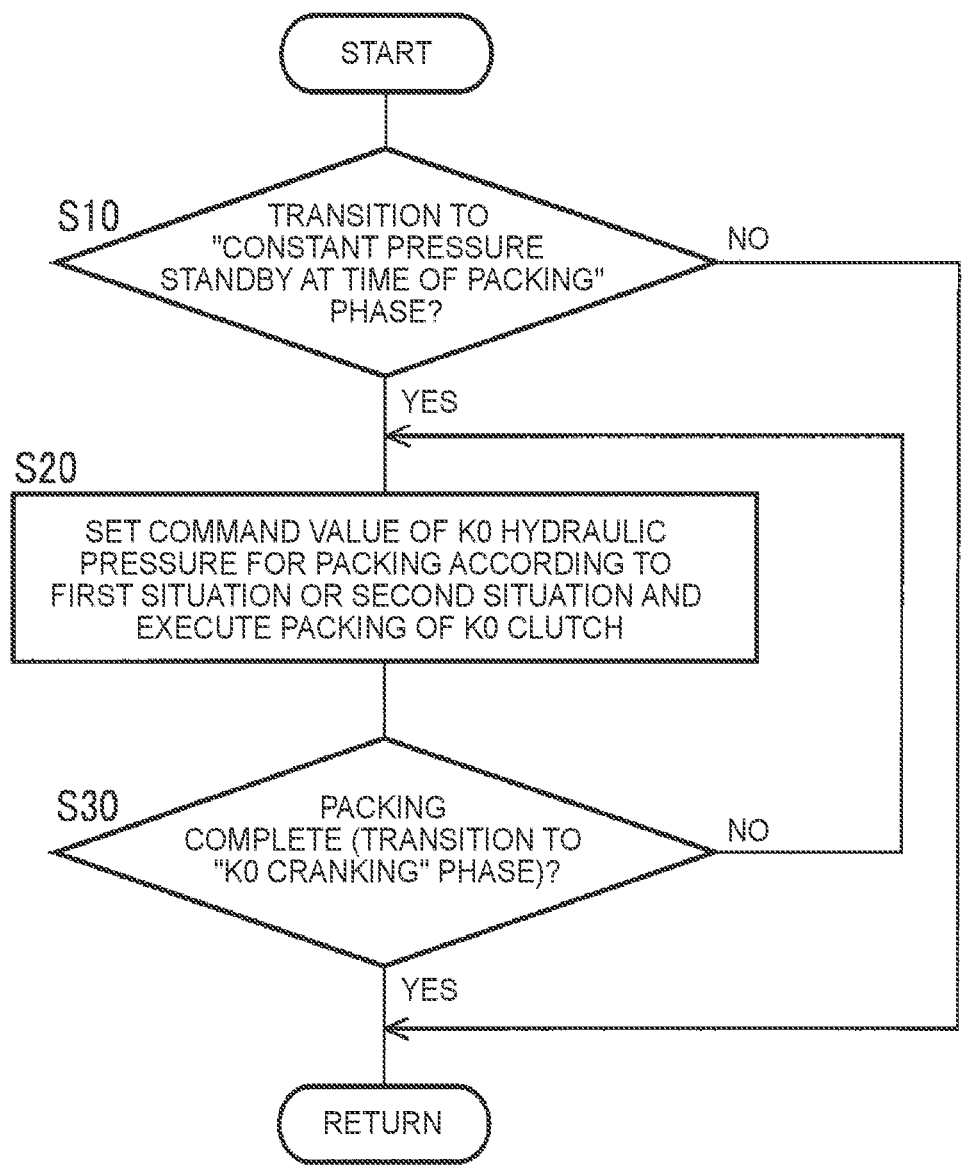

CONTROL DEVICE FOR VEHICLE

CROSS-REFERENCE TO RELATED APPLICATION

This application claims priority to Japanese Patent Application No. 2020-166514 filed on Sep. 30, 2020, incorporated herein by reference in its entirety.

BACKGROUND

1. Technical Field

The present disclosure relates to a control device for a vehicle including an engine, an electric motor, and a clutch capable of disconnecting the connection between the engine and the electric motor.

2. Description of Related Art

There is well known a control device for a vehicle including an engine, an electric motor connected to a power transmission path between the engine and drive wheels so as to be capable of transmitting power, and a clutch that is provided between the engine and the electric motor in the power transmission path. The control state of the clutch is switched by controlling a hydraulic clutch actuator. An example of the above control device is a drive control device for a hybrid vehicle described in Japanese Unexamined Patent Application Publication No. 2018-30507 (JP 2018-30507 A). JP 2018-30507 A discloses technologies in which, when the engine is started, the control state of the clutch is switched from the released state to the engaged state while gradually increasing the torque capacity of the clutch, and constant pressure control is performed to maintain a command value of the hydraulic pressure supplied to the clutch actuator at a constant pressure to perform a packing, which is a process of tightening a pack clearance of the clutch, prior to the gradual increase in the torque capacity of the clutch.

SUMMARY

The clutch cannot generate the torque capacity until packing is completed. However, in the constant pressure control, the time until the packing of the clutch is completed differs depending on the difference in the command value of the hydraulic pressure. Therefore, there is room for improving starting performance of the engine such as starting responsiveness and shock reduction by appropriately setting the command value of the hydraulic pressure in the constant pressure control.

The present disclosure has been made in the background of the above circumstances, and an object of the present disclosure is to provide a control device for a vehicle capable of improving the starting performance of an engine when the engine is started.

An aspect of the present disclosure relates to a control device for a vehicle including an engine, an electric motor connected to a power transmission path between the engine and drive wheels so as to be able to transmit power, a clutch provided between the engine and the electric motor in the power transmission path, a control state of the clutch configured to be switched by controlling a hydraulic clutch actuator, and a hydraulic control circuit system that supplies adjusted hydraulic pressure to the clutch actuator. The control device includes an electronic control unit configured to: output a first command value to the hydraulic control circuit system prior to output of a second command value to the hydraulic control circuit system during a transition of switching the control state of the clutch from a released state to an engaged state when the engine is started, the second command value being a command value for supplying the hydraulic pressure to the clutch actuator such that the clutch transmits cranking torque that raises a rotation speed of the engine, and the first command value being a command value for supplying the hydraulic pressure to the clutch actuator such that a pack clearance of the clutch is tightened; and perform, when the engine is started, first control for outputting the cranking torque by the electric motor and second control for starting operation of the engine, wherein the electronic control unit is configured to set the first command value to a first hydraulic pressure when the engine is started in a first situation, and set the first command value to a second hydraulic pressure higher than the first hydraulic pressure when the engine is started in a second situation.

According to the above aspect, when the engine is started in the first situation, the first command value for packing is set to the first hydraulic pressure having a constant pressure, whereas when the engine is started in the second situation, the first command value for packing is set to the second hydraulic pressure that has a constant pressure and that is higher than the first hydraulic pressure. Thus, the control for bringing the clutch into a packing completed state, in which a pack clearance is tightened, can be used properly depending on the first situation or the second situation, and the engine can be started according to the vehicle situation. For example, in the first situation, the starting shock is easily reduced, and in the second situation, the starting responsiveness is easily improved. Therefore, when the engine is started, the starting performance of the engine can be improved.

In the above aspect, the first hydraulic pressure may be a command value that maintains the clutch in a state where a torque capacity is not generated in the clutch and the packing clearance is tightened; and the second hydraulic pressure may be the second command value.

According to the above aspect, the first hydraulic pressure is a hydraulic pressure command value that maintains the clutch in a state where the torque capacity is not generated in the clutch and in the packing completed state. Thus, in the first situation, the starting shock is easily reduced. Further, since the second hydraulic pressure is a hydraulic pressure command value for cranking, the starting responsiveness is easily improved in the second situation.

In the above aspect, the first situation may be when a start of the engine is requested due to a cause other than a driving operation of a driver; and the second situation may be when the start of the engine is requested due to an increase in a drive request amount for the vehicle by the driver.

According to the above aspect, the first situation may be when the start of the engine is requested regardless of the driving operation of the driver. Thus, when the engine is started while it is difficult for the driver to feel uncomfortable even when the engine start is delayed, the hydraulic pressure command value for packing is set to the first hydraulic pressure, and the starting shock is easily reduced. On the other hand, the second situation may be when the start of the engine is requested due to an increase in the drive request amount by the driver. Thus, when the engine is started while the driver tends to feel uncomfortable when the engine start is delayed, the hydraulic pressure command value for packing is set to the second hydraulic pressure, and the starting responsiveness is easily improved.

In the above aspect, when the start of the engine is requested due to the cause other than the driving operation of the driver may be when the start of the engine is requested due to a request made to charge a power storage device with electric power generated by the electric motor using power of the engine, the power storage device being provided in the vehicle and being configured to transmit and receive the electric power to and from the electric motor.

According to the above aspect, when the start of the engine is requested regardless of the driving operation of the driver may be when the start of the engine is requested due to the request to charge the power storage device with the electric power generated by the electric motor using the power of the engine. Thus, when the engine is started to charge the power storage device, the starting shock is easily reduced.

In the above aspect, when the start of the engine is requested due to the cause other than the driving operation of the driver may be when the start of the engine is requested due to a request to warm up the engine.

According to the above aspect, when the start of the engine is requested regardless of the driving operation of the driver may be when the start of the engine is requested due to the request of warming up the engine. Thus, when the engine is started to warm up the engine, the starting shock is easily reduced.

In the above aspect, when the start of the engine is requested due to the cause other than the driving operation of the driver may be when the start of the engine is requested during driving support control for driving the vehicle by automatically performing at least acceleration and deceleration.

According to the above aspect, when the start of the engine is requested regardless of the driving operation of the driver may be when the start of the engine is requested during the driving support control. Thus, when the engine is started during the driving support control, the starting shock is easily reduced.

In the above aspect, the first situation may be when a start of the engine is requested during driving support control for driving the vehicle by automatically performing at least acceleration and deceleration; and the second situation may be when the start of the engine is requested due to an increase in a drive request amount for the vehicle during manual driving control for driving the vehicle based on a driving operation of a driver.

According to the above aspect, the first situation may be when the start of the engine is requested during the driving support control. Thus, when the engine is started while it is difficult for the driver to feel uncomfortable even when the engine start is delayed, the hydraulic pressure command value for packing is set to the first hydraulic pressure, and the starting shock is easily reduced. On the other hand, the second situation may be when the start of the engine is requested due to an increase in the drive request amount during the manual driving control. Thus, when the engine is started while the driver tends to feel uncomfortable when the engine start is delayed, the hydraulic pressure command value for packing is set to the second hydraulic pressure, and the starting responsiveness is easily improved.

In the above aspect, the first situation may be when the engine is started in cooperation with another control other than control for starting the engine; and the second situation may be when the engine is started without coordinating with the other control.

According to the above aspect, the first situation may be when the engine is started in cooperation with another control other than the control for starting the engine. Thus, when the engine is started while the starting shock is likely to occur, the hydraulic pressure command value for packing is set to the first hydraulic pressure, and the starting shock is easily reduced. On the other hand, the second situation may be when the engine is started without coordinating with the other control. Thus, when the engine is started while the starting shock is unlikely to occur, the hydraulic pressure command value for packing is set to the second hydraulic pressure, and the starting responsiveness is easily improved.

In the above aspect, the second situation may be a situation in which a timing of a first combustion in a start of the engine is earlier than a timing of a first combustion in a start of the engine in the first situation.

According to the above aspect, the second situation may be when the timing of the first combustion when the engine is started is earlier than that in the first situation. Thus, when the engine is started with advanced timing of the first combustion to improve the responsiveness, the hydraulic pressure command value for packing is set to the second hydraulic pressure, and the starting responsiveness is easily improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a chart illustrating each phase in a K0 control phase definition;

FIG. 5 is a flowchart illustrating a main part of a control operation of an electronic control device, and is a flowchart illustrating the control operation for improving the starting performance of the engine when the engine is started.

DETAILED DESCRIPTION OF EMBODIMENTS

Hereinafter, examples of the present disclosure will be described in detail with reference to the drawings.

Figure 1:
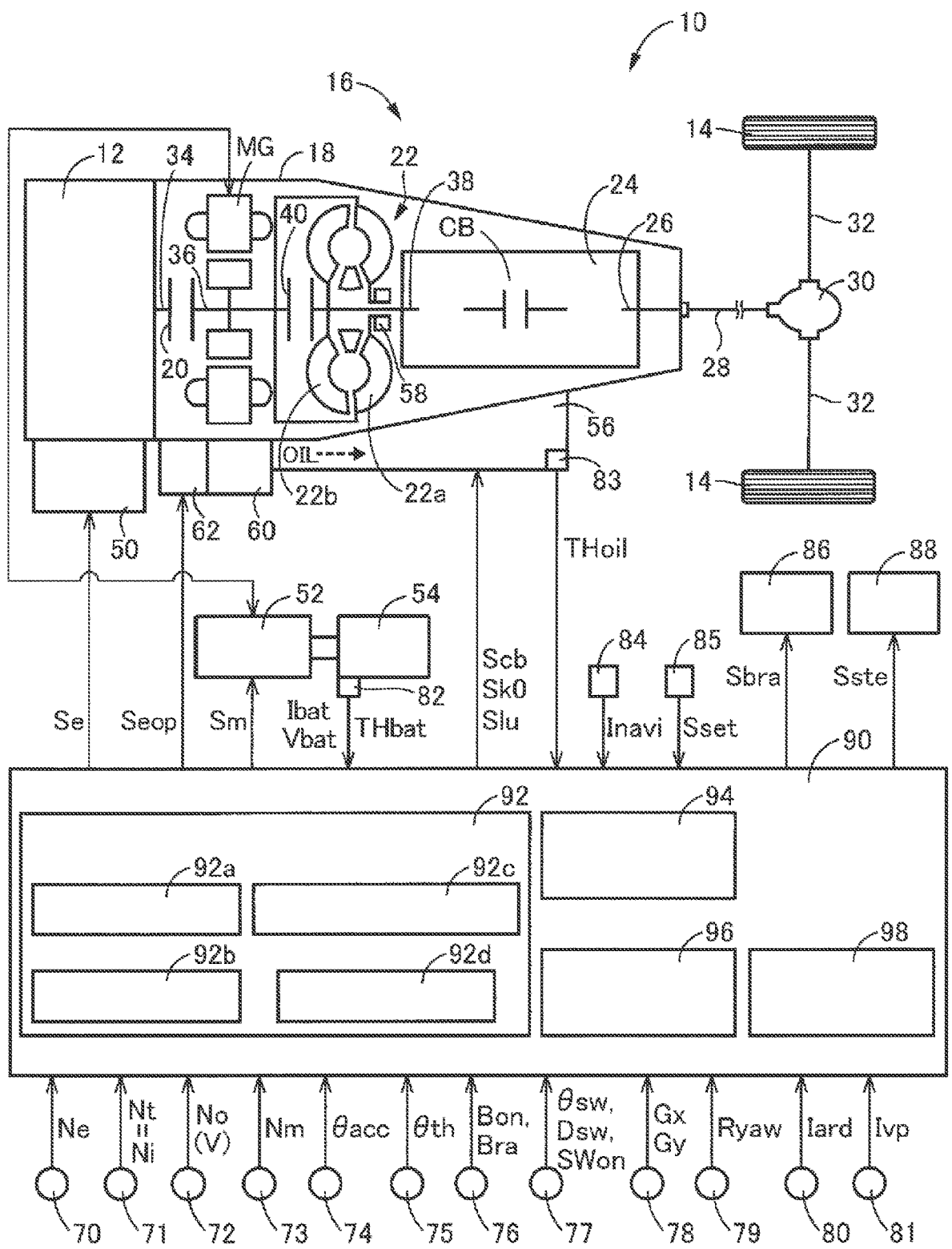
FIG. 1 is a diagram illustrating a schematic configuration of a vehicle to which the present disclosure is applied, and is a diagram illustrating control functions and a main part of a control system for various controls in the vehicle.

FIG. 1 is a diagram illustrating a schematic configuration of a vehicle 10 to which the present disclosure is applied, and is a diagram illustrating control functions and a main part of a control system for various controls in the vehicle 10. In FIG. 1, the vehicle 10 is a hybrid vehicle including an engine 12 and an electric motor MG, which are driving force sources for traveling. Further, the vehicle 10 includes drive wheels 14 and a power transmission device 16 provided in a power transmission path between the engine 12 and the drive wheels 14.

The engine 12 is a known internal combustion engine such as a gasoline engine or a diesel engine. In the engine 12, an engine torque Te that is an output torque of the engine 12 is controlled by controlling an engine control device 50 including a throttle actuator, a fuel injection device, an ignition device, and the like provided in the vehicle 10 by an electronic control device 90 described later.

The electric motor MG is a rotary electric machine having a function as a motor for generating mechanical power from electric power and a function as a generator for generating electric power from mechanical power, and is a so-called motor generator. The electric motor MG is connected to a battery 54 provided in the vehicle 10 via an inverter 52 provided in the vehicle 10. In the electric motor MG, the MG torque Tm that is the output torque of the electric motor MG is controlled by controlling the inverter 52 by the electronic control device 90 described later. The MG torque Tm is, for example, a power running torque for the positive torque on the acceleration side and a regenerative torque for the negative torque on the deceleration side when the rotation direction of the electric motor MG is a positive rotation that is the same as the rotation direction of the engine 12 when the engine 12 is operating. Specifically, the electric motor MG generates power for traveling with the electric power supplied from the battery 54 via the inverter 52 instead of the engine 12 or in addition to the engine 12. Further, the electric motor MG generates electric power with the power of the engine 12 or the driven force input from the drive wheels 14. The electric power generated by the power generation of the electric motor MG is stored in the battery 54 via the inverter 52. The battery 54 is a power storage device that transmits and receives electric power to and from the electric motor MG. Unless otherwise specified, the electric power also means the electric energy. Unless otherwise specified, the power also means the torque and force.

The power transmission device 16 includes a K0 clutch 20, a torque converter 22, an automatic transmission 24, and the like in a case 18 that is a non-rotating member attached to a vehicle body. The K0 clutch 20 is a clutch provided between the engine 12 and the electric motor MG in the power transmission path between the engine 12 and the drive wheels 14. The torque converter 22 is connected to the engine 12 via the K0 clutch 20. The automatic transmission 24 is connected to the torque converter 22 and is interposed in the power transmission path between the torque converter 22 and the drive wheels 14. The torque converter 22 and the automatic transmission 24 each constitute a part of the power transmission path between the engine 12 and the drive wheels 14. Further, the power transmission device 16 includes a propeller shaft 28 connected to a transmission output shaft 26 that is an output rotating member of the automatic transmission 24, a differential gear 30 connected to the propeller shaft 28, a pair of drive shafts 32 connected to the differential gear 30, and the like. Further, the power transmission device 16 includes an engine connecting shaft 34 that connects the engine 12 and the K0 clutch 20, an electric motor connecting shaft 36 that connects the K0 clutch 20 and the torque converter 22, and the like.

The electric motor MG is connected to the electric motor connecting shaft 36 in the case 18 so as to be able to transmit power. The electric motor MG is connected to the power transmission path between the engine 12 and the drive wheels 14, particularly the power transmission path between the K0 clutch 20 and the torque converter 22 so as to be able to transmit power. That is, the electric motor MG is connected to the torque converter 22 and the automatic transmission 24 so as to be able to transmit power without going through the K0 clutch 20. From a different point of view, the torque converter 22 and the automatic transmission 24 each constitute a part of the power transmission path between the electric motor MG and the drive wheels 14. The torque converter 22 and the automatic transmission 24 transmit the drive force from each of the driving force sources of the engine 12 and the electric motor MG to the drive wheels 14.

The torque converter 22 includes a pump impeller 22a connected to the electric motor connecting shaft 36, and a turbine impeller 22b connected to a transmission input shaft 38 that is an input rotating member of the automatic transmission 24. The pump impeller 22a is connected to the engine 12 via the K0 clutch 20 and is directly connected to the electric motor MG. The pump impeller 22a is an input member of the torque converter 22, and the turbine impeller 22b is an output member of the torque converter 22. The electric motor connecting shaft 36 is also an input rotating member of the torque converter 22. The transmission input shaft 38 is also an output rotating member of the torque converter 22, which is integrally provided with a turbine shaft that is rotationally driven by the turbine impeller 22b. The torque converter 22 is a fluid transmission device that transmits the drive force from each of the driving force sources (engine 12, electric motor MG) to the transmission input shaft 38 via a fluid. The torque converter 22 includes a lock-up (LU) clutch 40 that connects the pump impeller 22a and the turbine impeller 22b. The LU clutch 40 is a directly connected clutch that connects the input/output rotating members of the torque converter 22, that is, a known lock-up clutch.

The operating state, that is, the control state of the LU clutch 40 is switched when the LU clutch torque Tlu, which is the torque capacity of the LU clutch 40, is changed by the adjusted LU hydraulic pressure PRlu supplied from a hydraulic control circuit system 56 provided in the vehicle 10. The control state of the LU clutch 40 includes a fully released state in which the LU clutch 40 is released, a slip state in which the LU clutch 40 is engaged with slippage, and a fully engaged state in which the LU clutch 40 is engaged. When the LU clutch 40 is in the fully released state, the torque converter 22 is brought into a torque converter state in which a torque amplification effect can be obtained. Further, when the LU clutch 40 is in the fully engaged state, the torque converter 22 is brought into a lock-up state in which the pump impeller 22a and the turbine impeller 22b are integrally rotated.

The automatic transmission 24 is a known planetary gear automatic transmission including, for example, one set or a plurality of sets of planetary gear devices (not shown) and a plurality of engaging devices CB. The engaging device CB is a hydraulic friction engaging device composed of, for example, a multi-plate or a single-plate clutch and a brake pressed by a hydraulic actuator, a band brake tightened by the hydraulic actuator, or the like. In the engaging device CB, the control state such as the engaged state and the released state is switched by changing the CB torque Tcb, which is the respective torque capacity, by the adjusted CB hydraulic pressure PRcb supplied from the hydraulic control circuit system 56.

The automatic transmission 24 is a stepped transmission in which any one of a plurality of gears (also referred to as gear stages) having different gear ratios γat (=automatic transmission (AT) input rotation speed Ni/AT output rotation speed No) is established by engaging any of the engaging devices CB. In the automatic transmission 24, the gear stages are switched, that is, a plurality of gear stages are selectively established in accordance with the accelerator operation of the driver, the vehicle speed V, and the like by the electronic control device 90 described later. The AT input rotation speed Ni is the rotation speed of the transmission input shaft 38 and is the input rotation speed of the automatic transmission 24. The AT input rotation speed Ni is also the rotation speed of the output rotation member of the torque converter 22, and is the same value as the turbine rotation speed Nt, which is the output rotation speed of the torque converter 22. The AT input rotation speed Ni can be represented by the turbine rotation speed Nt. The AT output rotation speed No is the rotation speed of the transmission output shaft 26 and is the output rotation speed of the automatic transmission 24.

The K0 clutch 20 is a wet or dry friction engaging device composed of, for example, a multi-plate or a single-plate clutch pressed by a hydraulic clutch actuator 120 described later. The control state of the K0 clutch 20 is switched between states such as the engaged state and the released state by controlling the clutch actuator 120 by the electronic control device 90 described later.

Figure 2:
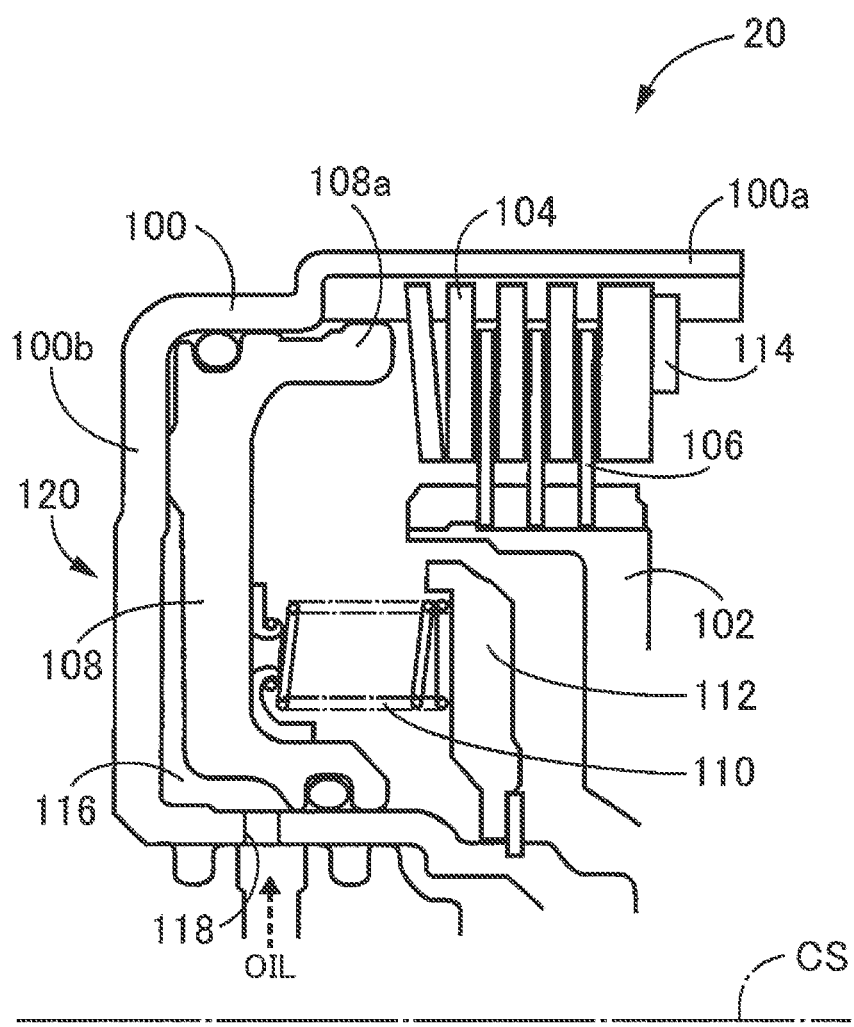
FIG. 2 is a partial sectional view showing an example of a K0 clutch.

FIG. 2 is a partial sectional view showing an example of the K0 clutch 20. In FIG. 2, the K0 clutch 20 includes a clutch drum 100, a clutch hub 102, separator plates 104, friction plates 106, a piston 108, a return spring 110, a spring receiving plate 112, and a snap ring 114. The clutch drum 100 and the clutch hub 102 are provided on the same axis CS. FIG. 2 shows the radial outer peripheral portion of the K0 clutch 20 in the upper half of the axis CS. The axis CS is the axis of the engine connecting shaft 34, the electric motor connecting shaft 36, and the like. The clutch drum 100 is connected to, for example, the engine connecting shaft 34, and is rotated integrally with the engine connecting shaft 34. The clutch hub 102 is connected to, for example, the electric motor connecting shaft 36, and is rotated integrally with the electric motor connecting shaft 36. Outer peripheral edges of a plurality of substantially annular plate-shaped separator plates 104 are fitted to the inner peripheral surface of a tubular portion 100a of the clutch drum 100 so as not to rotate relative to each other, that is, spline-fitted thereto. The friction plates 106 are interposed between the separator plates 104, and inner peripheral edges of a plurality of substantially annular plate-shaped friction plates 106 are fitted to the outer peripheral surface of the clutch hub 102 so as not to rotate relative to each other, that is, spline-fitted thereto. The piston 108 is provided with a pressing portion 108a extending in the direction toward the separator plates 104 and the friction plates 106 on the outer peripheral edge. The return spring 110 is interposed between the piston 108 and the spring receiving plate 112, and urges the piston 108 so that a part of the piston 108 abuts a bottom plate portion 100b of the clutch drum 100. That is, the return spring 110 functions as a spring element that urges the piston 108 so that the separator plates 104 and the friction plates 106 are not engaged. The snap ring 114 is fixed to the tubular portion 100a of the clutch drum 100 at a position where the separator plates 104 and the friction plates 106 are sandwiched between the snap ring 114 and the pressing portion 108a of the piston 108. In the K0 clutch 20, an oil chamber 116 is provided between the piston 108 and the bottom plate portion 100b of the clutch drum 100. An oil passage 118 leading to the oil chamber 116 is provided in the clutch drum 100. In the K0 clutch 20, the clutch actuator 120 as a hydraulic actuator is composed of the clutch drum 100, the piston 108, the return spring 110, the spring receiving plate 112, the oil chamber 116, and the like.

The hydraulic control circuit system 56 supplies the K0 hydraulic pressure PRk0, which is the adjusted hydraulic pressure, to the clutch actuator 120. In the K0 clutch 20, when the K0 hydraulic pressure PRk0 is supplied from the hydraulic control circuit system 56 to the oil chamber 116 through the oil passage 118, the K0 hydraulic pressure PRk0 causes the piston 108 to move toward the separator plates 104 and the friction plates 106 against the urging force of the return spring 110, causing the pressing portion 108a of the piston 108 to press the separator plates 104 and the friction plates 106. The K0 clutch 20 is switched to the engaged state when the separator plates 104 and the friction plates 106 are pressed. The control state of the K0 clutch 20 is switched by changing the K0 torque Tk0, which is the torque capacity of the K0 clutch 20, with the K0 hydraulic pressure PRk0.

The K0 torque Tk0 is determined by, for example, the friction coefficient of the friction material of the friction plates 106, the K0 hydraulic pressure PRk0, and the like. In the K0 clutch 20, the oil chamber 116 is filled with hydraulic oil OIL, and the pressing force (=PRk0×piston pressure receiving area) of the piston 108 against the urging force of the return spring 110 causes the clearances between the separator plates 104 and the friction plates 106 to be tightened. In other words, the pack clearance of the K0 clutch 20 is tightened, and so-called packing is completed. In the present embodiment, the state in which the pack clearance of the K0 clutch 20 is tightened is referred to as a packing completed state. In the K0 clutch 20, the K0 torque Tk0 is generated by further increasing the K0 hydraulic pressure PRk0 from the packing completed state. That is, the packing completed state of the K0 clutch 20 is a state in which the K0 clutch 20 starts to generate a torque capacity when the K0 hydraulic pressure PRk0 is increased from the packing completed state. The K0 hydraulic pressure PRk0 for packing the K0 clutch 20 is a K0 hydraulic pressure PRk0 for establishing the state where the piston 108 reaches the stroke end and the K0 torque Tk0 is not generated.

Returning to FIG. 1, in the engaged state of the K0 clutch 20, the pump impeller 22a and the engine 12 are integrally rotated via the engine connecting shaft 34. That is, when the K0 clutch 20 is engaged, the engine 12 and the drive wheels 14 are connected so as to be able to transmit power. On the other hand, in the released state of the K0 clutch 20, the power transmission between the engine 12 and the pump impeller 22a is cut off. That is, when the K0 clutch 20 is released, the connection between the engine 12 and the drive wheels 14 is disconnected. Since the electric motor MG is connected to the pump impeller 22a, the K0 clutch 20 is provided in the power transmission path between the engine 12 and the electric motor MG, and functions as a clutch that connects and disconnects the power transmission path, that is, a clutch that connects and disconnects the engine 12 and the electric motor MG. In other words, the K0 clutch 20 is a clutch for connection/disconnection that connects the engine 12 and the electric motor MG by being engaged, and disconnects the connection between the engine 12 and the electric motor MG by being released.

In the power transmission device 16, when the K0 clutch 20 is engaged, the power output from the engine 12 is transmitted from the engine connecting shaft 34 to the drive wheels 14 via the K0 clutch 20, the electric motor connecting shaft 36, the torque converter 22, the automatic transmission 24, the propeller shaft 28, the differential gear 30, the drive shafts 32, and the like in this order. Further, the power output from the electric motor MG is transmitted from the electric motor connecting shaft 36 to the drive wheels 14 via the torque converter 22, the automatic transmission 24, the propeller shaft 28, the differential gear 30, the drive shafts 32, and the like in this order regardless of the control state of the K0 clutch 20.

The vehicle 10 includes a mechanical oil pump MOP 58, an electric oil pump EOP 60, a pump motor 62, and the like. The MOP 58 is connected to the pump impeller 22a and is rotationally driven by a driving force source (engine 12, electric motor MG) to discharge the hydraulic oil OIL used in the power transmission device 16. The pump motor 62 is a motor dedicated to the EOP 60 for rotationally driving the EOP 60. The EOP 60 is rotationally driven by the pump motor 62 to discharge the hydraulic oil OIL. The hydraulic oil OIL discharged by the MOP 58 and the EOP 60 is supplied to the hydraulic control circuit system 56. The hydraulic control circuit system 56 supplies the CB hydraulic pressure PRcb, the K0 hydraulic pressure PRk0, the LU hydraulic pressure PRlu, and the like, which are adjusted based on the hydraulic oil OIL discharged by the MOP 58 and/or the EOP 60. The hydraulic control circuit system 56 can adjust the hydraulic pressure by receiving the command value. As an example, the pressure is adjusted by controlling a pressure adjusting element such as a solenoid valve based on a command value output to the hydraulic control circuit system 56.

The vehicle 10 further includes the electronic control device 90 including a control device for the vehicle 10 related to starting control of the engine 12. The electronic control device 90 is configured to include, for example, a so-called microcomputer provided with a central processing unit (CPU), random access memory (RAM), read-only memory (ROM), an input/output interface, and the like. The CPU performs signal processing in accordance with a program stored in the ROM in advance while using the temporary storage function of the RAM, thereby executing various controls of the vehicle 10. The electronic control device 90 includes computers for engine control, electric motor control, hydraulic pressure control, and the like, as necessary.

The electronic control device 90 is supplied with various signals (for example, the engine rotation speed Ne, which is the rotation speed of the engine 12, the turbine rotation speed Nt, which has the same value as the AT input rotation speed Ni, the AT output rotation speed No corresponding to the vehicle speed V, the MG rotation speed Nm, which is the rotation speed of the electric motor MG, the accelerator operation amount θacc, which is the accelerator operation amount of the driver indicating the magnitude of the acceleration operation of the driver, the throttle valve opening θth, which is the opening degree of the electronic throttle valve, the brake-on signal Bon, which is a signal indicating that the brake pedal for operating the wheel brake is being operated by the driver, the brake operation amount Bra, which indicates the magnitude of the brake pedal depression operation by the driver, the steering angle θsw and the steering direction Dsw of the steering wheel provided in the vehicle 10, the steering-on signal SWon, which is a signal indicating the state where the steering wheel is held by the driver, the front-rear acceleration Gx and the right-left acceleration Gy of the vehicle 10, the yaw rate Ryaw, which is the rotation angle speed around the vertical axis of the vehicle 10, the vehicle peripheral information Iard, the position information Ivp, the battery temperature THbat, the battery charge/discharge current Ibat, and the battery voltage Vbat of the battery 54, the hydraulic oil temperature THoil, which is the temperature of the hydraulic oil OIL in the hydraulic control circuit system 56, the navigation information Inavi, the driving support setting signals Sset, which are signals indicating the setting by the driver in the driving support control CTsd such as the autonomous driving control CTad and the cruise control CTcr, etc.) based on detection values detected by various sensors (for example, an engine rotation speed sensor 70, a turbine rotation speed sensor 71, an output rotation speed sensor 72, an MG rotation speed sensor 73, an accelerator operation amount sensor 74, a throttle valve opening sensor 75, a brake pedal sensor 76, a steering sensor 77, a G sensor 78, a yaw rate sensor 79, a vehicle peripheral information sensor 80, a vehicle position sensor 81, a battery sensor 82, an oil temperature sensor 83, a navigation system 84, driving support setting switches 85, etc.) provided in the vehicle 10.

The vehicle peripheral information sensor 80 includes, for example, at least one of a Light Detection and Ranging (LiDAR) sensor, a radar, an in-vehicle camera, and the like, and directly acquires information on a road on which the vehicle is traveling and information on an object existing around the vehicle. The LiDAR sensor is, for example, a plurality of LiDAR sensors that detects objects in front of the vehicle 10, objects on the sides of the vehicle 10, objects in the rear of the vehicle 10, and the like, or one LiDAR sensor that detects objects around the entire periphery of the vehicle 10, and outputs object information related to the detected object as the vehicle peripheral information Iard. The radar is, for example, a plurality of radars that detects an object in front of the vehicle 10, an object in the vicinity of the front of the vehicle 10, an object in the vicinity of the rear of the vehicle 10, and the like, and outputs object information related to the detected object as the vehicle peripheral information Iard. The object information obtained by the LiDAR sensor or the radar includes the distance and direction of the detected object from the vehicle 10. The in-vehicle camera is, for example, a monocular camera or a stereo camera that images the front or rear of the vehicle 10, and outputs the imaged information as the vehicle peripheral information Iard. This imaged information includes information such as lanes of the traveling lane, signs on the traveling lane, parking spaces, and other vehicles, pedestrians, and obstacles on the traveling lane.

The vehicle position sensor 81 includes a global positioning system (GPS) antenna and the like. The position information Ivp includes host vehicle position information, which is information indicating the current position of the vehicle 10 on the ground surface or a map based on a GPS signal (orbit signal) transmitted by a GPS satellite.

The navigation system 84 is a known navigation system having a display, a speaker, and the like. The navigation system 84 identifies the position of the host vehicle on the map data stored in advance, based on the position information Ivp. The navigation system 84 displays the position of the host vehicle on the map displayed on the display. When the destination is input, the navigation system 84 calculates the travel route from the departure point to the destination point, and instructs the driver of the travel route and the like with a display, a speaker, or the like. The navigation information Inavi includes, for example, map information such as road information and facility information based on the map data stored in advance in the navigation system 84. The road information includes information such as road types such as urban roads, suburban roads, mountain roads, and highways, road branching and merging, road gradients, and speed limits. The facility information includes information such as the type, location, and name of a site such as a supermarket, a store, a restaurant, a parking lot, a park, a troubleshooter for the vehicle 10, the driver's home, and a service area on a highway. The service area is, for example, a site equipped with facilities for parking, meals, refueling, and the like on a highway.

The driving support setting switches 85 include an autonomous driving selection switch for executing the autonomous driving control CTad, a cruise switch for executing the cruise control CTcr, a switch for setting the vehicle speed in the cruise control CTcr, a switch for setting a distance between the host vehicle and a preceding vehicle in the cruise control CTcr, a switch for executing lane-keeping control for traveling while maintaining the set lane, and the like.

Various command signals (for example, the engine control command signal Se for controlling the engine 12, the MG control command signal Sm for controlling the electric motor MG, the CB hydraulic control command signal Scb for controlling the engaging device CB, the K0 hydraulic control command signal Sk0 for controlling the K0 clutch 20, the LU hydraulic control command signal Slu for controlling the LU clutch 40, the EOP control command signal Seop for controlling the EOP 60, the brake control command signal Sbra for controlling braking torque by wheel brake, the steering control command signal Sste for controlling the steering of the wheels (particularly the front wheels)) are output from the electronic control device 90 to each relevant device (for example, the engine control device 50, the inverter 52, the hydraulic control circuit system 56, the pump motor 62, the wheel brake device 86, the steering device 88, etc.) provided in the vehicle 10.

The wheel brake device 86 is a braking device that applies braking torque with the wheel brake to the wheels. The wheel brake device 86 supplies brake hydraulic pressure to the wheel cylinders provided on the wheel brakes in response to, for example, the brake pedal depression operation by the driver. In the wheel brake device 86, normally, the master cylinder hydraulic pressure having a magnitude corresponding to the brake operation amount Bra, which is generated from the brake master cylinder, is supplied to the wheel cylinders as the brake hydraulic pressure. On the other hand, in the wheel brake device 86, for example, during anti-lock braking system (ABS) control, skid suppression control, automatic vehicle speed control CTas, autonomous driving control CTad, or the like, brake hydraulic pressure necessary for each control is supplied to the wheel cylinders to generate braking torque by the wheel brake. The wheels are drive wheels 14 and driven wheels (not shown).

The steering device 88 applies assist torque to the steering system of the vehicle 10 in accordance with, for example, the vehicle speed V, the steering angle θsw, the steering direction Dsw, the yaw rate Ryaw, and the like. In the steering device 88, for example, during the autonomous driving control CTad, torque for controlling the steering of the front wheels is applied to the steering system of the vehicle 10.

In order to realize various controls in the vehicle 10, the electronic control device 90 includes a hybrid control means, that is, a hybrid control unit 92, a clutch control means, that is, a clutch control unit 94, a shift control means, that is, a shift control unit 96, and a driving control means, that is, a driving control unit 98.

The hybrid control unit 92 has a function as an engine control means that controls the operation of the engine 12, that is, an engine control unit 92a, and a function as an electric motor control means that controls the operation of the electric motor MG via the inverter 52, that is, an electric motor control unit 92b, and executes hybrid drive control and the like with the engine 12 and the electric motor MG using the above control functions.

The hybrid control unit 92 calculates the drive request amount for the vehicle 10. The drive request amount for the vehicle 10 is, for example, the drive request amount for the vehicle 10 by the driver at the time of manual driving control CTmd, or for example, the drive request amount for the vehicle 10 required by the driving support control CTsd at the time of the driving support control CTsd. The drive request amount is, for example, a required drive force Frdem [N] for the drive wheels 14, a required drive torque Trdem [Nm] for the drive wheels 14, a required AT output torque for the transmission output shaft 26, and the like. The required drive torque Trdem is, from a different point of view, the required drive power Prdem [W] at the vehicle speed V at that time. That is, the required drive force Frdem, the required drive torque Trdem, the required drive power Prdem, and the like can be converted into each other.

For example, at the time of manual driving control CTmd, the hybrid control unit 92 calculates the driver-required drive force Frdemd as the drive request amount for the vehicle 10 by the driver by applying the accelerator operation amount θacc and the vehicle speed V to the drive request amount map, for example. The drive request amount map indicates a relationship that is experimentally or designedly obtained and stored in advance, that is, a predetermined relationship. In the calculation of the driver-required drive force Frdemd, the AT output rotation speed No or the like may be used instead of the vehicle speed V. As the drive request amount for the vehicle 10 by the driver, the accelerator operation amount θacc or the like may be used.

For example, at the time of the driving support control CTsd, the hybrid control unit 92 calculates the system-required drive force Frdems as the drive request amount for the vehicle 10 required by the driving support control CTsd.

The hybrid control unit 92 outputs the engine control command signal Se that controls the engine 12 and the MG control command signal Sm that controls the electric motor MG to realize the required drive power Prdem in consideration of the transmission loss, the auxiliary load, the gear ratio γat of the automatic transmission 24, the rechargeable power Win and the dischargeable power Wout of the battery 54, and the like. The engine control command signal Se is, for example, a command value of the engine power Pe, which is the power of the engine 12 that outputs the engine torque Te at the engine rotation speed Ne at that time. The MG control command signal Sm is, for example, a command value of the power consumption Wm of the electric motor MG that outputs the MG torque Tm at the MG rotation speed Nm at that time.

The rechargeable power Win of the battery 54 is the maximum power that can be input that defines the limit of the input power of the battery 54, and indicates the input limit of the battery 54. The dischargeable power Wout of the battery 54 is the maximum power that can be output that defines the limit of the output power of the battery 54, and indicates the output limit of the battery 54. The rechargeable power Win and the dischargeable power Wout of the battery 54 are calculated by the electronic control device 90 based on, for example, the battery temperature THbat and the charge state value SOC [%] of the battery 54. The charge state value SOC of the battery 54 is a value indicating the charge state of the battery 54, and is calculated by the electronic control device 90 based on, for example, the battery charge/discharge current that and the battery voltage Vbat.

When the required drive torque Trdem can be covered only by the output of the electric motor MG, the hybrid control unit 92 sets the traveling mode to the motor traveling (=EV traveling) mode. In the EV traveling mode, the hybrid control unit 92 performs EV traveling in which the K0 clutch 20 is in the released state and the vehicle travels using only the electric motor MG as a driving force source. On the other hand, when the required drive torque Trdem cannot be covered unless at least the output of the engine 12 is used, the hybrid control unit 92 sets the traveling mode to the engine traveling mode, that is, the hybrid traveling (=HV traveling) mode. In the HV traveling mode, the hybrid control unit 92 performs engine traveling, that is, HV traveling, in which the K0 clutch 20 is in the engaged state and the vehicle travels using at least the engine 12 as a driving force source. Even when the required drive torque Trdem can be covered using only the output of the electric motor MG, the hybrid control unit 92 establishes the HV traveling mode when the charge state value SOC of the battery 54 is less than a predetermined engine start threshold value, when warming up of the engine 12 or the like is required, and the like. The engine start threshold value is a predetermined threshold value for determining that the charge state value SOC indicates the need to forcibly start the engine 12 to charge the battery 54. In this way, the hybrid control unit 92 automatically stops the engine 12 during the HV traveling, restarts the engine 12 after the engine is stopped, or starts the engine 12 during the EV traveling based on the required drive torque Trdem or the like, thereby switching between the EV traveling mode and the HV traveling mode.

The hybrid control unit 92 further includes a function as an engine start determination means, that is, an engine start determination unit 92c, and a function as a start control means, that is, a start control unit 92d.

The engine start determination unit 92c determines whether there is a start request for the engine 12. For example, in the EV traveling mode, the engine start determination unit 92c determines whether there is a start request for the engine 12 based on whether the required drive torque Trdem has increased beyond the range where it can be covered only by the output of the electric motor MG, whether the engine 12 or the like needs to be warmed up, whether the charge state value SOC of the battery 54 is less than the engine start threshold value, or the like. Further, the engine start determination unit 92c determines whether the start control of the engine 12 is completed.

The clutch control unit 94 controls the K0 clutch 20 so as to execute the start control of the engine 12. For example, when the engine start determination unit 92c determines that there is a start request for the engine 12, the clutch control unit 94 outputs the K0 hydraulic control command signal Sk0 for controlling the K0 clutch 20 in the released state toward the engaged state to the hydraulic control circuit system 56, so that the K0 torque Tk0 for transmitting to the engine 12 side the torque required for cranking the engine 12, which is the torque for raising the engine rotation speed Ne, is acquired. That is, the clutch control unit 94 outputs to the hydraulic control circuit system 56 the K0 hydraulic control command signal Sk0 for controlling the clutch actuator 120 so as to switch the control state of the K0 clutch 20 from the released state to the engaged state, when the engine 12 is started. In the present embodiment, the torque required for cranking the engine 12 is referred to as the required cranking torque Tcrn.

The start control unit 92d controls the engine 12 and the electric motor MG so as to execute the start control of the engine 12. For example, when the engine start determination unit 92c determines that there is a start request for the engine 12, the start control unit 92d outputs to the inverter 52 the MG control command signal Sm for outputting the required cranking torque Tcrn by the electric motor MG in accordance with the switching of the K0 clutch 20 to the engaged state by the clutch control unit 94. That is, when the engine 12 is started, the start control unit 92d outputs to the inverter 52 the MG control command signal Sm for controlling the electric motor MG so that the electric motor MG outputs the required cranking torque Tcrn.

Further, when the engine start determination unit 92c determines that there is a start request for the engine 12, the start control unit 92d outputs to the engine control device 50 the engine control command signal Se for starting fuel supply, ignition, or the like in conjunction with the cranking of the engine 12 by the K0 clutch 20 and the electric motor MG. That is, when the engine 12 is started, the start control unit 92d outputs to the engine control device 50 the engine control command signal Se for controlling the engine 12 so that the engine 12 starts operation.

At the time of cranking the engine 12, the cranking reaction force torque Trfcr, which is a reaction force torque associated with the engagement of the K0 clutch 20, is generated. This cranking reaction force torque Trfcr causes a feeling of pulling in the vehicle 10 due to inertia when the engine is started during the EV traveling, that is, a drop in the drive torque Tr. Therefore, the required cranking torque Tcrn output by the electric motor MG when starting the engine 12 is also the MG torque Tm for canceling out the cranking reaction force torque Trfcr. That is, the required cranking torque Tcrn is the K0 torque Tk0 required for cranking the engine 12, and corresponds to the MG torque Tm flowing from the electric motor MG side to the engine 12 side via the K0 clutch 20. The required cranking torque Tcrn is, for example, a constant cranking torque Tcr that is predetermined based on, for example, the specifications of the engine 12.

When the engine 12 is started during the EV traveling, the start control unit 92d outputs from the electric motor MG the MG torque Tm for the required cranking torque Tcrn in addition to the MG torque Tm for the EV traveling, that is, the MG torque Tm for generating the drive torque Tr. Thus, during the EV traveling, it is necessary to secure the required cranking torque Tcrn in preparation for starting the engine 12. Therefore, the range in which the required drive torque Trdem can be covered only by the output of the electric motor MG is the torque range obtained by subtracting the required cranking torque Tcrn from the maximum torque of the electric motor MG that can be output. The maximum torque of the electric motor MG that can be output is the maximum MG torque Tm that can be output with the dischargeable power Wout of the battery 54.

The shift control unit 96 determines the shift of the automatic transmission 24 by using, for example, a shift map indicating a predetermined relationship, and outputs to the hydraulic control circuit system 56 the CB hydraulic control command signal Scb for executing the shift control of the automatic transmission 24 as needed. The shift map indicates, for example, a predetermined relationship having a shift line for determining the shift of the automatic transmission 24 on two-dimensional coordinates using the vehicle speed V and the required drive torque Trdem as variables. In the shift map, the AT output rotation speed No or the like may be used instead of the vehicle speed V, or the required drive force Frdem, the accelerator operation amount θacc, the throttle valve opening θth, or the like may be used instead of the required drive torque Trdem.

As the driving control of the vehicle 10, the driving control unit 98 can perform manual driving control CTmd that drives the vehicle 10 based on the driving operation of the driver, and the driving support control CTsd that drives the vehicle 10 by automatically performing at least one of acceleration/deceleration, braking, and steering regardless of the driving operation of the driver.

The manual driving control CTmd is driving control for traveling by manual driving by the driver's driving operation. The manual driving is a driving method in which the vehicle 10 normally travels by a driver's driving operation such as an accelerator operation for acceleration/deceleration, a braking operation for braking, and a steering operation for steering.

The driving support control CTsd is, for example, driving control for traveling with driving support that automatically supports a part or all of the driving operation of the driver. The driving support is a driving method in which the vehicle 10 travels by automatically performing all or part of acceleration/deceleration, braking, steering, and the like under the control of the electronic control device 90 based on signals, information, and the like from various sensors, regardless of the driving operation of the driver. The driving support control CTsd is the autonomous driving control CTad in which the vehicle 10 travels by autonomous driving in which the target traveling state is automatically set based on, for example, the destination and the map information input by the driver, and acceleration/deceleration, braking, steering, and the like are automatically performed based on the target traveling state. Alternatively, the driving support control CTsd is, for example, automatic vehicle speed control CTas that controls the vehicle speed V regardless of the accelerator operation amount θacc, automatic parking control that automatically parks the vehicle 10 at the target parking position, and the like. The automatic vehicle speed control CTas is the known cruise control CTcr in which the driver partially performs driving operations such as steering operation and acceleration/deceleration, braking, and the like are automatically performed. Alternatively, the automatic vehicle speed control CTas is known automatic vehicle speed limit control (adjustable speed limiter (ASL)) that controls the drive force Fr so that the vehicle speed V does not exceed the target vehicle speed set by the driver, for example.

When the autonomous driving selection switch, the cruise switch, and the like in the driving support setting switches 85 are turned off and the driving by the driving support is not selected, the driving control unit 98 establishes the manual driving mode and executes the manual driving control CTmd. The driving control unit 98 outputs commands for controlling the engine 12, the electric motor MG, the automatic transmission 24, and the like to the hybrid control unit 92, the shift control unit 96, and the like in response to the driver's operation or the like to execute the manual driving control CTmd.

When the driver operates the autonomous driving selection switch in the driving support setting switches 85 and autonomous driving is selected, the driving control unit 98 establishes the autonomous driving mode and executes the autonomous driving control CTad. Specifically, the driving control unit 98 automatically sets the target traveling state based on the host vehicle position information based on a destination input by the driver, the position information Ivp, the map information based on the navigation information Inavi and the like, and various types of information on traveling lanes based on vehicle peripheral information Iard and the like. In addition to outputting commands to the hybrid control unit 92, the shift control unit 96, and the like for controlling the engine 12, the electric motor MG, the automatic transmission 24, and the like so as to automatically perform acceleration/deceleration, braking, and steering based on the set target traveling state, the driving control unit 98 outputs the brake control command signal Sbra for obtaining the required braking torque to the wheel brake device 86 and outputs the steering control command signal Sste for controlling the steering of the front wheels to the steering device 88, to perform the autonomous driving control CTad.

Here, in order to accurately control the control state of the K0 clutch 20 when the engine 12 is started, the K0 control phase definition Dphk0 is predetermined in the electronic control device 90, in which a plurality of progress stages, that is, phases that are divided for each control state of the K0 clutch 20 switched in the starting process of the engine 12 is defined for controlling the clutch actuator 120.

FIG. 3 is a chart illustrating each phase in the K0 control phase definition Dphk0. In FIG. 3, the K0 control phase definition Dphk0 includes definitions of phases such as "K0 standby", "quick apply", "constant pressure standby at the time of packing", "K0 cranking", "quick drain", "constant pressure standby before re-engagement", "initial rotation synchronization", "intermediate rotation synchronization", "end rotation synchronization", "engagement transition sweep", "full engagement transition sweep", "full engagement", "backup sweep", and "calculation stop".

The phase is transitioned to the "K0 standby" phase when there is a K0 standby determination when starting the start control of the engine 12. The "K0 standby" phase is a phase in which the K0 clutch 20 is made to stand by without starting the control at the start control of the engine 12.

The phase is transitioned to the "quick apply" phase when there is no K0 standby determination when starting the start control of the engine 12. Alternatively, the phase is transitioned to the "quick apply" phase from the "K0 standby" phase when the K0 standby determination is withdrawn during standby for the control start of the K0 clutch 20. The "quick apply" phase is a phase in which a quick apply that temporarily applies a high command value of the K0 hydraulic pressure PRk0 is executed to quickly complete the packing of the K0 clutch 20, and the initial responsiveness of the K0 hydraulic pressure PRk0 is improved. The command value of the K0 hydraulic pressure PRk0 is the hydraulic pressure command value for the solenoid valve for the K0 clutch 20 in the hydraulic control circuit system 56 that outputs the adjusted K0 hydraulic pressure PRk0, that is, the K0 hydraulic control command signal Sk0.

The phase is transitioned to the "constant pressure standby at the time of packing" phase from the "quick apply" phase when the quick apply is completed. The "constant pressure standby at the time of packing" phase is a phase of standby at a constant pressure in order to complete the packing of the K0 clutch 20.

The phase is transitioned to the "K0 cranking" phase from the "constant pressure standby at the time of packing" phase when the packing of the K0 clutch 20 is completed. The "K0 cranking" phase is a phase in which the engine 12 is cranked by the K0 clutch 20.

The phase is transitioned to the "quick drain" phase from the "K0 cranking" phase when the cranking of the engine 12 is completed and there is a quick drain execution determination. The "quick drain" phase is a phase in which, the quick drain is executed in which the command value of a low K0 hydraulic pressure PRk0 is temporarily output so that a predetermined K0 hydraulic pressure PRk0, for example, a pack end pressure can be quickly made to standby in the next phase, that is, the "constant pressure standby before re-engagement" phase, to improve the initial responsiveness of the K0 hydraulic pressure PRk0.

The phase is transitioned to the "constant pressure standby before re-engagement" phase from the "K0 cranking" phase when the cranking of the engine 12 is completed and there is no quick drain execution determination. Alternatively, the phase is transitioned to the "constant pressure standby before re-engagement" phase from the "quick drain" phase when the quick drain is completed. The "constant pressure standby before re-engagement" phase is a phase of standby at a predetermined K0 torque Tk0 so as not to disturb the complete combustion of the engine 12. The complete combustion of the engine 12 is, for example, a state in which self-sustaining rotation due to the combustion of the engine 12 is stable after the initial combustion in which the ignition of the engine 12 is started. The fact that the complete combustion of the engine 12 is not disturbed means that the self-sustaining rotation of the engine 12 is not hindered.

The phase is transitioned to the "initial rotation synchronization" phase from the "constant pressure standby before re-engagement" phase when neither the transition condition to the "end rotation synchronization" phase nor the transition condition to the "intermediate rotation synchronization" phase are satisfied at the time of the complete combustion notification from the engine control unit 92a. The transition condition to the "end rotation synchronization" phase is a condition that the K0 difference rotation ΔNk0 is equal to or less than the predetermined end rotation synchronization transition determination difference rotation. The K0 difference rotation ΔNk0 is the difference rotation speed (=Nm−Ne) of the K0 clutch 20. The transition condition to the "intermediate rotation synchronization" phase is a condition that the transition condition to the "end rotation synchronization" phase is not satisfied and the K0 difference rotation ΔNk0 is equal to or less than the predetermined intermediate rotation synchronization transition determination difference rotation. The intermediate rotation synchronization transition determination difference rotation is a value larger than the end rotation synchronization transition determination difference rotation. The "initial rotation synchronization" phase is a phase in which the K0 torque Tk0 is controlled to assist the increase in the engine rotation speed Ne in order to quickly synchronize the engine rotation speed Ne and the MG rotation speed Nm. The engine control unit 92a outputs the complete combustion notification of the engine 12 (see FIG. 4A and FIG. 4B referred to below) when, for example, the elapsed time from the time when the engine rotation speed Ne reaches the predetermined complete combustion rotation speed of the engine 12 exceeds the predetermined complete combustion notification standby time TMeng. The complete combustion notification standby time TMeng is predetermined in consideration of, for example, the exhaust gas requirement for the engine 12.

The phase is transitioned to the "intermediate rotation synchronization" phase from the "constant pressure standby before re-engagement" phase when the transition condition to the "intermediate rotation synchronization" phase is satisfied at the time of the complete combustion notification from the engine control unit 92a. Alternatively, the phase is transitioned to the "intermediate rotation synchronization" phase from the "initial rotation synchronization" phase when the transition condition to the "intermediate rotation synchronization" phase is satisfied during the execution of the "initial rotation synchronization" phase. The "intermediate rotation synchronization" phase is a phase in which the K0 torque Tk0 is controlled so that the engine 12 has an appropriate blowing amount (=Ne−Nm).

The phase is transitioned to the "end rotation synchronization" phase from the "constant pressure standby before re-engagement" phase when the transition condition to the "end rotation synchronization" phase is satisfied at the time of the complete combustion notification from the engine control unit 92a. Alternatively, the phase is transitioned to the "end rotation synchronization" phase from the "initial rotation synchronization" phase when the transition condition to the "end rotation synchronization" phase is satisfied during the execution of the "initial rotation synchronization" phase. Alternatively, the phase is transitioned to the "end rotation synchronization" phase from the "intermediate rotation synchronization" phase when the transition condition to the "end rotation synchronization" phase is satisfied during the execution of the "intermediate rotation synchronization" phase. Alternatively, the phase is transitioned to the "end rotation synchronization" phase from the "intermediate rotation synchronization" phase when, during the execution of the "intermediate rotation synchronization" phase, the shift control of the automatic transmission 24 is not performed and a state where it is predicted that the engine rotation speed Ne and the MG rotation speed Nm cannot be synchronized is continuously established for the forced rotation synchronization transition determination time or longer. The prediction of whether the engine rotation speed Ne and the MG rotation speed Nm can be synchronized is determined based on, for example, the K0 difference rotation ΔNk0, the change gradient of the engine rotation speed Ne, and the change gradient of the MG rotation speed Nm. The "end rotation synchronization" phase is a phase in which the K0 torque Tk0 is controlled to synchronize the engine rotation speed Ne and the MG rotation speed Nm.

The phase is transitioned to the "engagement transition sweep" phase from the "end rotation synchronization" phase when the rotation synchronization determination is established during the execution of the "end rotation synchronization" phase. The rotation synchronization determination is a determination as to whether the determination that the absolute value of the K0 difference rotation ΔNk0 is equal to or less than the predetermined rotation synchronization determination difference rotation is continuously made for the predetermined number of rotation synchronization determination times or more. The "engagement transition sweep" phase is a phase in which the K0 torque Tk0 is gradually increased to bring the K0 clutch 20 into the engaged state.

The phase is transitioned to the "full engagement transition sweep" phase from the "engagement transition sweep" phase when the K0 engagement determination is established during the execution of the "engagement transition sweep" phase. The K0 engagement determination is a determination as to whether the determination that the absolute value of the K0 difference rotation ΔNk0 is equal to or less than the predetermined full engagement transition sweep determination difference rotation is continuously made for the predetermined number of full engagement transition sweep determination times or more. Alternatively, the phase is transitioned to the "full engagement transition sweep" phase from the "engagement transition sweep" phase when the K0 rotation synchronization state cannot be maintained during the execution of the "engagement transition sweep" phase. The case where the K0 rotation synchronization state cannot be maintained means that the determination that the absolute value of the K0 difference rotation ΔNk0 exceeds the value obtained by adding the predetermined forced engagement transition determination difference rotation to the full engagement transition sweep determination difference rotation is continuously made for the predetermined number of rotation divergence full engagement transition sweep transition determination times or more. Alternatively, the phase is transitioned to the "full engagement transition sweep" phase from the "engagement transition sweep" phase when the elapsed time from the start of the "engagement transition sweep" phase exceeds the predetermined forced engagement transition determination time and the absolute value of the K0 difference rotation $\Delta Nk0$ is determined to be equal to or more than the predetermined full engagement transition sweep forced transition determination difference rotation. The "full engagement transition sweep" phase is a phase in which the K0 torque Tk0 is gradually increased to bring the K0 clutch 20 into the fully engaged state. To bring the K0 clutch 20 to the fully engaged state means, for example, increasing the K0 torque Tk0 to a state in which a safety factor that can guarantee the engagement of the K0 clutch 20 is applied.

The phase is transitioned to the "full engagement" phase from the "full engagement transition sweep" phase when the full engagement determination is established during the execution of the "full engagement transition sweep" phase. The full engagement determination is a determination as to whether the determination that the K0 torque Tk0 is equal to or larger than the value obtained by multiplying the required K0 torque Tk0$n$ by the predetermined safety factor (>1) is continuously made for the predetermined number of complete synchronization determination times or more. The required K0 torque Tk0$n$ is the K0 torque Tk0 required for the full engagement of the K0 clutch 20, and for example, the maximum value of the engine torque Te, the MG torque Tm, and the minimum full engagement guaranteed torque is selected. The minimum full engagement guaranteed torque is the minimum K0 torque Tk0 required for a predetermined full engagement. Alternatively, the phase is transitioned to the "full engagement" phase from the "full engagement transition sweep" phase when the elapsed time from the start of the "full engagement transition sweep" phase is equal to or more than the predetermined forced full engagement transition determination time and the absolute value of the K0 difference rotation $\Delta Nk0$ is determined to be equal to or more than the predetermined full engagement forced transition determination difference rotation. The "full engagement" phase is a phase in which the K0 clutch 20 is maintained in a fully engaged state.

The phase is transitioned to the "full engagement" phase also from the "backup sweep" phase. The phase is transitioned to the "full engagement" phase from the "backup sweep" phase when, during the execution of the "backup sweep" phase, the full engagement determination is established and the determination that the absolute value of the K0 difference rotation $\Delta Nk0$ is equal to or less than the predetermined backup rotation synchronization determination difference rotation is continuously established for the predetermined number of backup rotation synchronization determination times or more. Alternatively, the phase is transitioned to the "full engagement" phase from the "backup sweep" phase when, during the execution of the "backup sweep" phase, the elapsed time from the transition to a phase other than the "K0 standby" phase after the start control of the engine 12 is started is equal to or more than the predetermined engine start control timeout time and the absolute value of the K0 difference rotation $\Delta Nk0$ is determined to be equal to or more than the full engagement forced transition determination difference rotation.

The phase is transitioned to the "backup sweep" phase from the running phase when, for example, during the execution of any one of the "K0 cranking" phase, the "constant pressure standby before re-engagement" phase, the "initial rotation synchronization" phase, the "intermediate rotation synchronization" phase, and the "end rotation synchronization" phase, in order to suppress the control stack, the elapsed time from the start of the running phase exceeds the predetermined backup transition determination time for the running phase, and the K0 difference rotation $\Delta Nk0$ is determined to be equal to or more than the predetermined backup transition determination difference rotation for the running phase. The "backup sweep" phase is a phase in which backup control is performed by gradually increasing the K0 torque Tk0 and engaging the K0 clutch 20.

The "calculation stop" phase is a phase in which the calculation of the base correction pressure of the K0 hydraulic pressure PRk0 and the required K0 torque Tk0$d$ used for the start control of the engine 12 is stopped while fail-safe control is being executed when the engine 12 is started. The fail-safe control is control for switching the oil passage in the hydraulic control circuit system 56 so as to supply the K0 hydraulic pressure PRk0 capable of maintaining the fully engaged state of the K0 clutch 20 to the clutch actuator 120 without going through the solenoid valve for the K0 clutch 20 when, for example, a failure occurs in which the K0 hydraulic pressure PRk0 adjusted by the solenoid valve for the K0 clutch 20 in the hydraulic control circuit system 56 is not output. The K0 hydraulic pressure PRk0 capable of maintaining the fully engaged state is a source pressure such as a line pressure supplied to the solenoid valve for the K0 clutch 20 or the like, for example. The base correction pressure is a value obtained by correcting the base pressure of the K0 hydraulic pressure PRk0 used for the start control of the engine 12 based on the hydraulic oil temperature THoil or the like. The required K0 torque Tk0$d$ is the K0 torque Tk0 required for cranking the engine 12 and switching the K0 clutch 20 to the engaged state at the time of the start control of the engine 12.

The K0 control phase definition Dphk0 is created for the purpose of calculating the base correction pressure of the K0 hydraulic pressure PRk0 and the required K0 torque Tk0$d$ used for the start control of the engine 12, for example. The K0 control phase definition Dphk0 defines each phase based on the required state of control for the K0 clutch 20 to control the K0 hydraulic pressure PRk0 and the K0 torque Tk0. That is, the K0 control phase definition Dphk0 is defined based on the control request for switching the control state of the K0 clutch 20.

When the engine 12 is started, the clutch control unit 94 controls the clutch actuator 120 so as to switch the control state of the K0 clutch 20 from the released state to the engaged state based on the K0 control phase definition Dphk0.

When the engine 12 is started, the start control unit 92$d$ controls the electric motor MG and the engine 12 in accordance with the control state of the K0 clutch 20. In the start control of the engine 12, the electric motor MG may be controlled so that the required cranking torque Tcrn is output by the electric motor MG, and the engine 12 may be controlled so that the engine 12 starts operation. Therefore, when the engine 12 is started, the start control unit 92$d$ controls the electric motor MG and the engine 12 based on the phases necessary for controlling the electric motor MG and the engine 12 in the K0 control phase definition Dphk0. As a result, control can be simplified when the engine 12 is started.

Figure 4A:
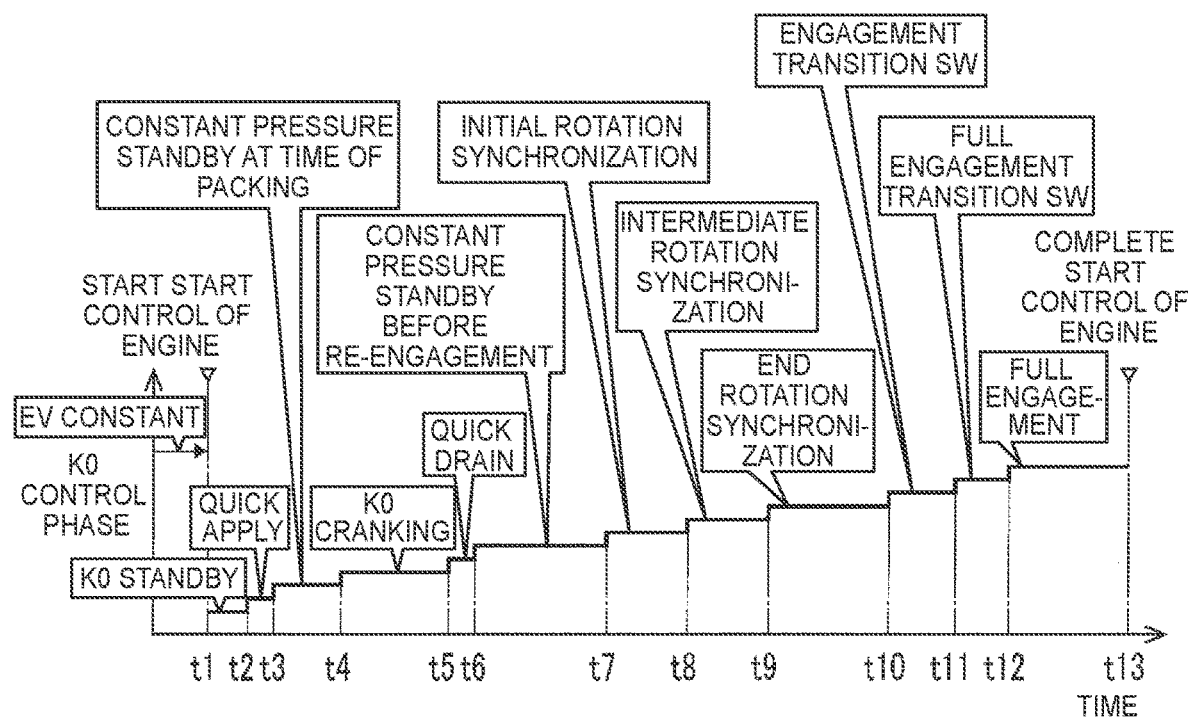
FIG. 4A is a diagram showing an example of a time chart when start control of an engine is executed.
Figure 4B:
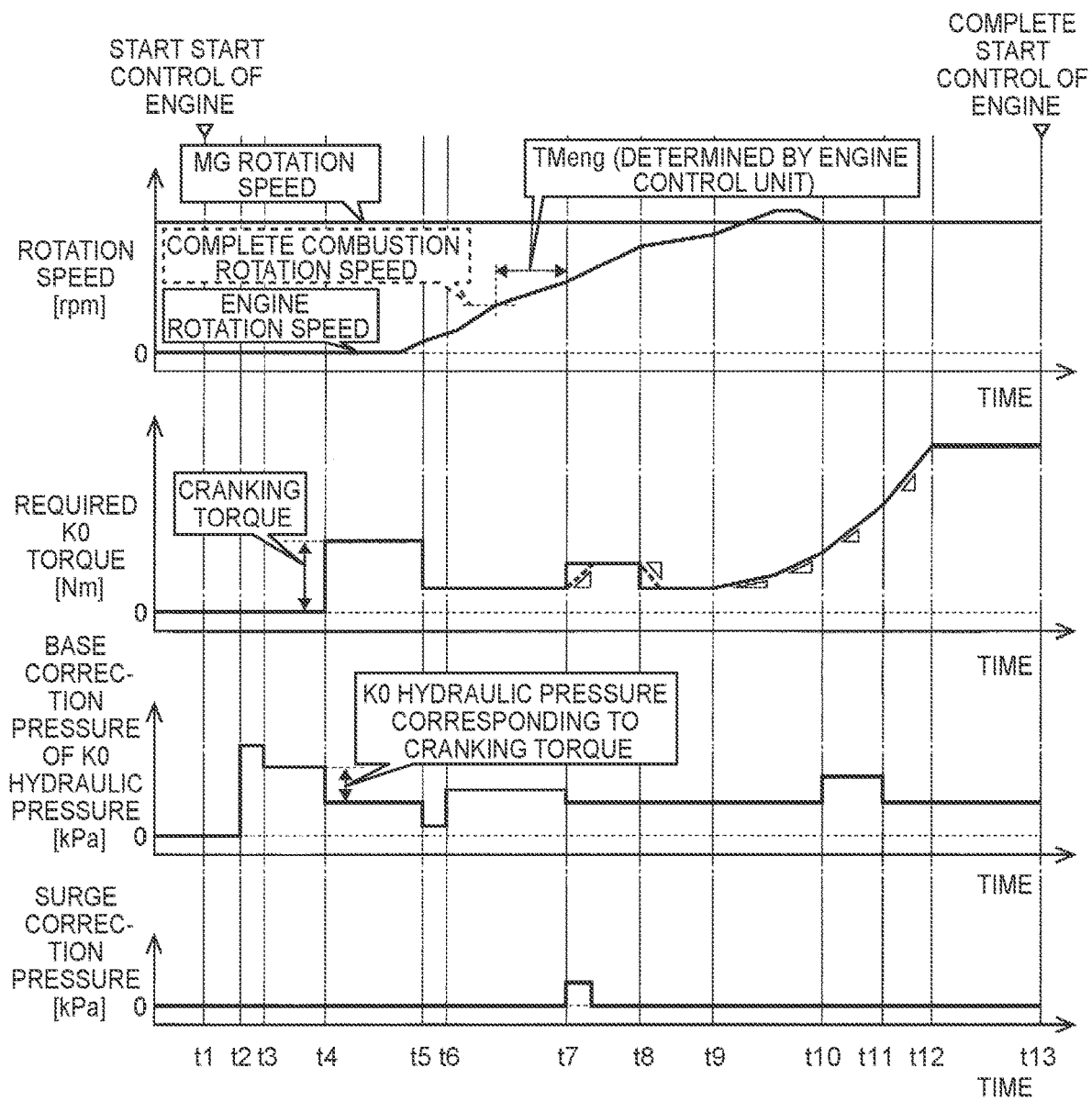
FIG. 4B is a diagram showing an example of a time chart when start control of an engine is executed.

FIG. 4A and FIG. 4B are diagrams showing an example of a time chart when the start control of the engine 12 is executed. In FIG. 4A, the "K0 control phase" indicates the transition state of each phase in the K0 control phase definition Dphk0. Further, the total hydraulic pressure value obtained by adding the hydraulic pressure value obtained by converting the required K0 torque Tk0$d$ to the K0 hydraulic pressure PRk0 to the base correction pressure of the K0 hydraulic pressure PRk0 is output as the command value of the K0 hydraulic pressure PRk0. The time point t1 indicates the time when a start request for the engine 12 is made and the start control of the engine 12 is started when the vehicle is stopped in the idle state in the EV traveling mode or during the EV traveling. After starting the start control of the engine 12, the "K0 standby" phase (see time point t1 to time point t2), the "quick apply" phase (see time point t2 to time point t3), and the "constant pressure standby at the time of packing" phase (see time point t3 to time point t4) are executed. Following the packing control of the K0 clutch 20, the "K0 cranking" phase is executed (see time point t4 to time point t5). In the embodiment of FIG. 4A and FIG. 4B, the K0 hydraulic pressure PRk0 corresponding to the required cranking torque Tcrn required in the "K0 cranking" phase is added in the "constant pressure standby at the time of packing" phase. In the "constant pressure standby at the time of packing" phase, the actual K0 hydraulic pressure PRk0 is not raised to a value equal to or more than the value that generates the K0 torque Tk0. In the "K0 cranking" phase, the actual K0 hydraulic pressure PRk0 is raised to a value equal to or more than the value that generates the K0 torque Tk0. In the "K0 cranking" phase, the required K0 torque Tk0d, that is, the MG torque Tm having a magnitude corresponding to the required cranking torque Tcrn is output from the electric motor MG. In the "K0 cranking" phase, when the engine rotation speed Ne is increased, ignition or the like is started and the engine 12 is combusted for the first time. When the ignition start is performed, for example, the engine 12 is first combusted substantially at the same time as the start of raising the engine rotation speed Ne. After the first combustion of the engine 12, the "quick drain" phase (see time point t5 to time point t6) and the "constant pressure standby before re-engagement" phase (see time point t6 to time point t7) are executed, in which a low command value of K0 hydraulic pressure PRk0 is temporarily output, following the "K0 cranking" phase so as not to disturb the complete combustion of the engine 12. When the engine complete combustion notification is output from the engine control unit 92a (see time point t7), the "initial rotation synchronization" phase (see time point t7 to time point t8), the "intermediate rotation synchronization" phase (see time point t8 to time point t9), the "end rotation synchronization" phase (see time point t9 to time point t10), and the "engagement transition sweep ("engagement transition SW" in FIG. 4A)" phase (see time point t10 to time point t11) are executed, and rotation synchronization control of the engine 12 and the electric motor MG is executed. Following the "engagement transition sweep" phase, the "full engagement transition sweep ("full engagement transition SW" in FIG. 4A)" phase is executed (see time point t11 to time point t12), and the K0 torque Tk0 is gradually increased to the state in which the safety factor that can guarantee the engagement of the K0 clutch 20 is applied. When the K0 torque Tk0 is raised to a state in which the safety factor that can guarantee the engagement of the K0 clutch 20 is applied, the "full engagement" phase is executed (see time point t12 to time point t13), and the fully engaged state of the K0 clutch 20 is maintained. Time point t13 indicates the time point when the start control of the engine 12 is completed. Although the phases described above are not illustrated in FIG. 4B, periods in FIG. 4B correspond to periods of phases illustrated in FIG. 4A respectively.

With reference to the "K0 cranking" phase of FIG. 3, FIG. 4A and FIG. 4B, when the engine 12 is started, during the transition in which the control state of the K0 clutch 20 is switched from the released state to the engaged state, the clutch control unit 94 outputs to the hydraulic control circuit system 56 the command value of the K0 hydraulic pressure PRk0 for cranking to supply the K0 hydraulic pressure PRk0 to the clutch actuator 120 so that the K0 clutch 20 transmits the cranking torque Tcr that raises the engine rotation speed Ne. Further, referring to the "constant pressure standby at the time of packing" phase of FIG. 3, FIG. 4A and FIG. 4B, when the engine 12 is started, the clutch control unit 94 outputs to the hydraulic control circuit system 56 the command value of the K0 hydraulic pressure PRk0 for packing to supply the K0 hydraulic pressure PRk0 to the clutch actuator 120 so that the K0 clutch 20 is brought into the packing completed state, prior to the output of the command value of the K0 hydraulic pressure PRk0 for cranking for the "K0 cranking" phase. In the present embodiment, the command value of the K0 hydraulic pressure PRk0 for packing is referred to as the K0 packing command value Sk0pk.

In the "constant pressure standby at the time of packing" phase, the time until the K0 clutch 20 is brought into the packing completed state differs depending on the difference in the K0 packing command value Sk0pk. Therefore, it is desirable to improve the starting performance of the engine 12, such as starting responsiveness and shock reduction, by appropriately setting the K0 packing command value Sk0pk.

In the present embodiment, two types of vehicle situations ST are illustrated, in which the first situation ST1 and the second situation ST2 differ from each other, and the K0 packing command value Sk0pk corresponding to each vehicle situation ST is set.

When the vehicle situation ST is the first situation ST1 is, for example, when it is difficult for the driver to feel uncomfortable even when the engine start is delayed. Specifically, when the vehicle situation ST is the first situation ST1 is when the engine 12 is requested to start regardless of the driving operation of the driver. When the start of the engine 12 is requested regardless of the driving operation of the driver is, for example, when the start of the engine 12 is requested due to a request to charge the battery 54 with the electric power generated by the electric motor MG using the power of the engine 12, that is, when the charge state value SOC of the battery 54 is less than the predetermined engine start threshold value. Alternatively, when the start of the engine 12 is requested regardless of the driving operation of the driver is, for example, when the start of the engine 12 is requested due to a request to warm up the engine 12, that is, when warming up the engine 12 or the like is necessary. Alternatively, when the start of the engine 12 is requested regardless of the driving operation of the driver is, for example, when the start of the engine 12 is requested during the driving support control for driving the vehicle 10 by automatically performing at least acceleration/deceleration in the driving support control CTsd. That is, when the vehicle situation ST is the first situation ST1 is when the start of the engine 12 is requested during the driving support control for driving the vehicle 10 by automatically performing at least acceleration/deceleration, and specifically, for example, during autonomous driving control CTad or during automatic vehicle speed control CTas.

Alternatively, when the vehicle situation ST is the first situation ST1 is, for example, when a starting shock is likely to occur. Specifically, when the vehicle situation ST is the first situation ST1 is when the engine 12 is started in cooperation with another control other than the control for starting the engine 12. The other control other than the control for starting the engine 12 is, for example, the shift control of the automatic transmission 24, the control for switching the control state of the LU clutch 40, and the like.

On the other hand, when the vehicle situation ST is the second situation ST2 is, for example, when the driver tends to feel uncomfortable when the engine start is delayed. Specifically, when the vehicle situation ST is the second situation ST2 is when the start of the engine 12 is requested due to an increase in the drive request amount for the vehicle 10 by the driver. That is, when the vehicle situation ST is the second situation ST2 is when the start of the engine 12 is requested due to an increase in the drive request amount for the vehicle 10 during the manual driving control CTmd.

Alternatively, when the vehicle situation ST is the second situation ST2 is when a starting shock is unlikely to occur. Specifically, when the vehicle situation ST is the second situation ST2 is when the engine 12 is started without coordinating with another control other than the control for starting the engine 12.

The first situation ST1 is when it is difficult for the driver to feel uncomfortable even when the engine start is delayed, or when a starting shock is likely to occur. Therefore, when the engine 12 is started in the first situation ST1, reducing the starting shock is prioritized over improving the starting responsiveness. On the other hand, the second situation ST2 is when the driver tends to feel uncomfortable when the engine start is delayed, or when the starting shock is unlikely to occur. Therefore, when the engine 12 is started in the second situation ST2, improving the starting responsiveness is prioritized over reducing the starting shock.

When the engine 12 is started while the vehicle situation ST is the first situation ST1, the clutch control unit 94 sets a K0 packing command value Sk0*pk* that makes it easier to reduce the starting shock. On the other hand, when the engine 12 is started while the vehicle situation ST is the second situation ST2, the clutch control unit 94 sets a K0 packing command value Sk0*pk* that makes it easier to improve the starting responsiveness.

When the hydraulic pressure value of the K0 packing command value Sk0*pk* is low, the starting shock is easily reduced, whereas when the K0 packing command value Sk0*pk* is high, the starting responsiveness is easily improved. When the engine 12 is started while the vehicle situation ST is the first situation ST1, the clutch control unit 94 sets the K0 packing command value Sk0*pk* to the first hydraulic pressure PR1 having a constant pressure that makes it easier to reduce the starting shock. On the other hand, when the engine 12 is started while the vehicle situation ST is the second situation ST2, the clutch control unit 94 sets the K0 packing command value Sk0*pk* to the second hydraulic pressure PR2 that has a constant pressure and that is higher than the first hydraulic pressure PR1, which makes it easier to improve the starting responsiveness.

Considering that the first hydraulic pressure PR1 is a value set in the "constant pressure standby at the time of packing" phase, for example, the first hydraulic pressure PR1 is set to the command value of the K0 hydraulic pressure PRk0 that maintains the K0 clutch 20, for example, in the state where the torque capacity is not generated in the K0 clutch 20 and in the packing completed state. On the other hand, considering the continuity of transition from the "constant pressure standby at the time of packing" phase to the "K0 cranking" phase, the second hydraulic pressure PR2 is set to the command value of the K0 hydraulic pressure PRk0 for cranking for the "K0 cranking" phase, for example.

The clutch control unit 94 determines whether the packing of the K0 clutch 20 has been completed in the "constant pressure standby at the time of packing" phase. When the clutch control unit 94 determines that the packing of the K0 clutch 20 has been completed, the clutch control unit 94 transitions to the "K0 cranking" phase. The clutch control unit 94 determines whether the packing of the K0 clutch 20 has been completed based on whether the elapsed time from the start of the "constant pressure standby at the time of packing" phase is equal to or more than the constant pressure standby duration at the time of packing TMp. The first constant pressure standby duration TMp1, which is the constant pressure standby duration at the time of packing TMp in the first situation ST1, is basically a value longer than the second constant pressure standby duration TMp2, which is the constant pressure standby duration at the time of packing TMp in the second situation ST2.

When the engine 12 is started while the vehicle situation ST is the first situation ST1, the clutch control unit 94 sets the first constant pressure standby duration TMp1 based on, for example, the value of the original pressure such as the line pressure supplied to the solenoid valve for the K0 clutch 20 and the hydraulic oil temperature THoil. On the other hand, when the engine 12 is started while the vehicle situation ST is the second situation ST2, the clutch control unit 94 sets the second constant pressure standby duration TMp2 based on, for example, the required cranking torque Tcrn, the value of the original pressure such as the line pressure supplied to the solenoid valve for the K0 clutch 20, and the hydraulic oil temperature THoil.

The time during which the oil passage to the clutch actuator 120 is filled with the hydraulic oil OIL is changed depending on the state of the line pressure. The first constant pressure standby duration TMp1 and the second constant pressure standby duration TMp2 are each set to longer values when the value of the line pressure is low than when the value of the line pressure is high. Alternatively, since the viscosity of the hydraulic oil OIL changes depending on the hydraulic oil temperature THoil, the time during which the oil passage to the clutch actuator 120 is filled with the hydraulic oil OIL is changed. The first constant pressure standby duration TMp1 and the second constant pressure standby duration TMp2 are each set to longer values when the hydraulic oil temperature THoil is low than when the hydraulic oil temperature THoil is high. Alternatively, the K0 hydraulic pressure PRk0 to be raised during the "constant pressure standby at the time of packing" phase changes depending on the cranking torque Tcr. The second constant pressure standby duration TMp2 is set to a longer value when the required cranking torque Tcrn is high than when the required cranking torque Tcrn is low.

Considering that improving the starting responsiveness is prioritized over reducing the starting shock when starting the engine 12 in the second situation ST2, apart from the setting of the K0 packing command value Sk0*pk* suitable for the second situation ST2, the timing of the first combustion in the start control of the engine 12 may be earlier than that in the first situation ST1. In this case, the second situation ST2 can be seen as when the timing of the first combustion when the engine 12 is started is earlier than that in the first situation ST1.

Figure 6:
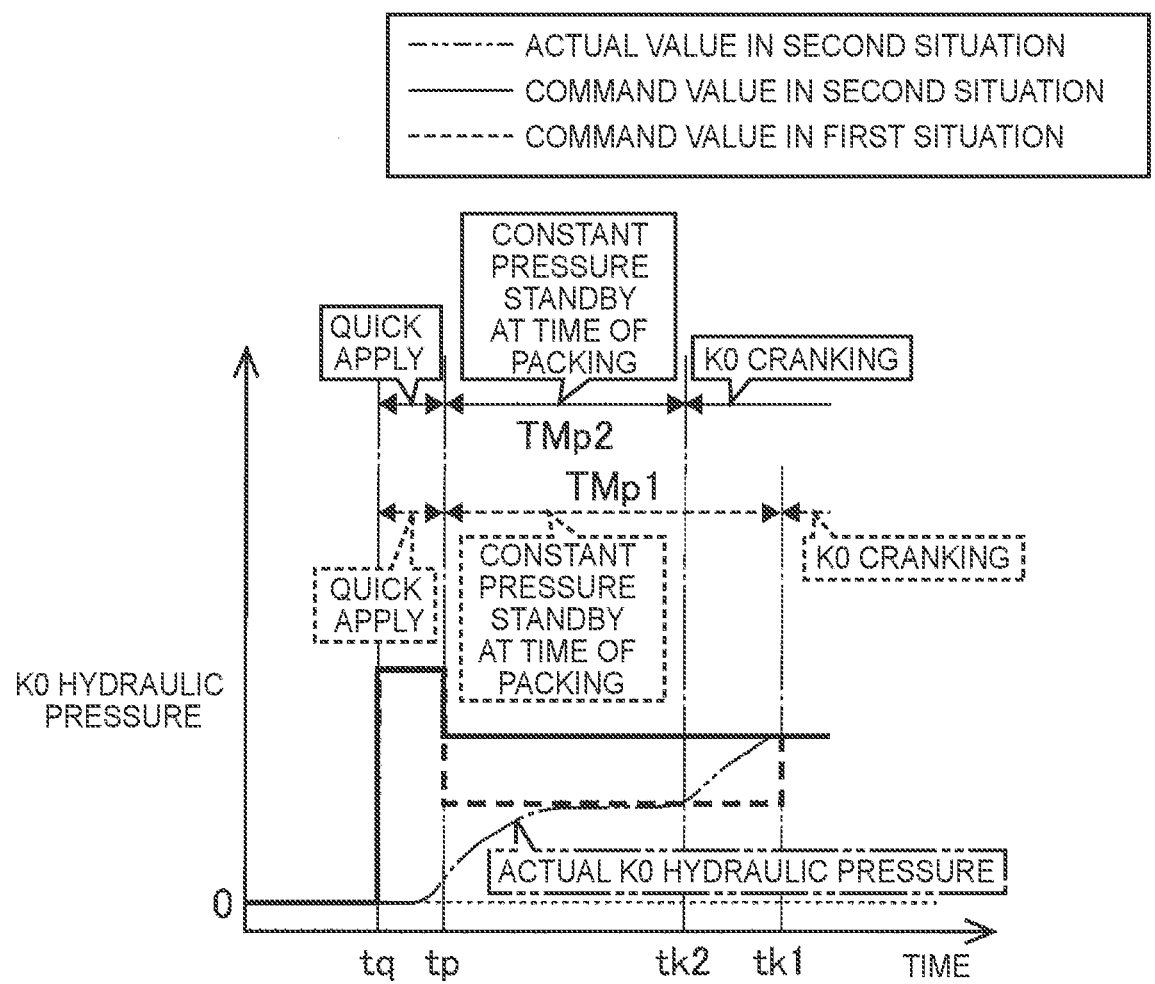
FIG. 6 is a diagram showing an example of a time chart when the control operation shown in the flowchart of FIG. 5 is executed.

FIG. 5 is a flowchart illustrating a main part of the control operation of the electronic control device 90, and is a flowchart illustrating the control operation for improving the starting performance of the engine 12 when the engine 12 is started. The control operation is executed during the start control of the engine 12, for example. FIG. 6 is a diagram showing an example of a time chart when the control operation shown in the flowchart of FIG. 5 is executed.

In FIG. 5, first, in step (hereinafter, "step" is omitted) S10 corresponding to the function of the clutch control unit 94, it is determined whether to transition from the "quick apply" phase to the "constant pressure standby at the time of packing" phase. If the determination of S10 is denied, this routine is terminated. If the determination in S10 is affirmed, in S20 corresponding to the function of the clutch control unit 94, the command value of the K0 hydraulic pressure PRk0 for packing (=K0 packing command value Sk0$pk$) according to the first situation ST1 or the second situation ST2 is set, and the control to complete the packing of the K0 clutch 20 is executed. Next, in S30 corresponding to the function of the clutch control unit 94, it is determined whether the packing of the K0 clutch 20 has been completed. That is, it is determined whether to transition to the "K0 cranking" phase. If the determination of S30 is denied, the above S20 is executed. If the determination of S30 is affirmed, this routine is terminated.

FIG. 6 shows an example of the K0 packing command value Sk0$pk$ set in the "constant pressure standby at the time of packing" phase during the start control of the engine 12. In FIG. 6, time point tp indicates the time when the quick apply in the "quick apply" phase that has been started from time point tq is completed and the transition to the "constant pressure standby at the time of packing" phase is completed, that is, the start time of the "constant pressure standby at the time of packing". In the first situation ST1 shown by the broken line, for example, the command value of the K0 hydraulic pressure PRk0 that maintains the K0 clutch 20 in the state where the torque capacity is not generated in the K0 clutch 20 and the packing completed state is set as the K0 packing command value Sk0$pk$. In the first situation ST1, the "constant pressure standby at the time of packing" phase is executed to time point tk1 where the first constant pressure standby duration TMp1 has elapsed from time point tp, and the "K0 cranking" phase is executed from time point tk1 so that the command value of the K0 hydraulic pressure PRk0 is increased to the command value of the K0 hydraulic pressure PRk0 for cranking. On the other hand, in the second situation ST2 shown by the solid line, for example, the command value of the K0 hydraulic pressure PRk0 for cranking for the "K0 cranking" phase is set as the K0 packing command value Sk0$pk$. In the second situation ST2, the "constant pressure standby at the time of packing" phase is executed to time point tk2 where the second constant pressure standby duration TMp2 has elapsed from time point tp, and the "K0 cranking" phase is executed from time point tk2. The K0 hydraulic pressure PRk0 shown by the long dashed double-short dashed line indicates the actual value in the second situation ST2.

As described above, according to the present embodiment, when the engine 12 is started in the first situation ST1, the K0 packing command value Sk0$pk$ is set to the first hydraulic pressure PR1, which makes it easier to reduce the starting shock, whereas when the engine 12 is started in the second situation ST2, the K0 packing command value Sk0$pk$ is set to the second hydraulic pressure PR2 higher than the first hydraulic pressure PR1, which makes it easier to improve the starting responsiveness. Thus, the control for bringing the K0 clutch 20 into the packing completed state can be used properly depending on the first situation ST1 or the second situation ST2, and the engine 12 can be started according to the vehicle situation ST. For example, in the first situation ST1, the starting shock is easily reduced, and in the second situation ST2, the starting responsiveness is easily improved. Therefore, when the engine 12 is started, the starting performance of the engine 12 can be improved.

Further, according to the present embodiment, the first hydraulic pressure PR1 is a command value of the K0 hydraulic pressure PRk0 that maintains the K0 clutch 20 in a state where the torque capacity is not generated in the K0 clutch 20 and in the packing completed state. Thus, in the first situation ST1, the starting shock is easily reduced. Further, since the second hydraulic pressure PR2 is the command value of the K0 hydraulic pressure PRk0 for cranking for the "K0 cranking" phase, the starting responsiveness is easily improved in the second situation ST2.

Further, according to the present embodiment, the first situation ST1 is when the start of the engine 12 is requested regardless of the driving operation of the driver. Thus, when the engine 12 is started while it is difficult for the driver to feel uncomfortable even when the engine start is delayed, the K0 packing command value Sk0$pk$ is set to the first hydraulic pressure PR1, and the starting shock is easily reduced. On the other hand, the second situation ST2 is when the start of the engine 12 is requested due to an increase in the drive request amount for the vehicle 10 by the driver. Thus, when the engine 12 is started while the driver tends to feel uncomfortable when the engine start is delayed, the K0 packing command value Sk0$pk$ is set to the second hydraulic pressure PR2, and the starting responsiveness is easily improved.

Further, according to the present embodiment, when the start of the engine 12 is requested regardless of the driving operation of the driver is when the start of the engine 12 is requested due to the request to charge the battery 54 with the electric power generated by the electric motor MG using the power of the engine 12. Thus, when the engine 12 is started to charge the battery 54, the starting shock is easily reduced.

Further, according to the present embodiment, when the start of the engine 12 is requested regardless of the driving operation of the driver is when the start of the engine 12 is requested due to the request of warming up the engine 12. Thus, when the engine 12 is started to warm up the engine 12, the starting shock is easily reduced.

Further, according to the present embodiment, when the start of the engine 12 is requested regardless of the driving operation of the driver is when the start of the engine 12 is requested during the driving support control for driving the vehicle 10 by automatically performing at least acceleration/deceleration. Thus, when the engine 12 is started during the driving support control such as the autonomous driving control CTad, the starting shock is easily reduced.

Further, according to the present embodiment, the first situation ST1 is when the start of the engine 12 is requested during the driving support control for driving the vehicle 10 by automatically performing at least acceleration/deceleration. Thus, when the engine 12 is started while it is difficult for the driver to feel uncomfortable even when the engine start is delayed, the K0 packing command value Sk0$pk$ is set to the first hydraulic pressure PR1, and the starting shock is easily reduced. On the other hand, the second situation ST2 is when the start of the engine 12 is requested due to an increase in the drive request amount for the vehicle 10 during the manual driving control CTmd. Thus, when the engine 12 is started while the driver tends to feel uncomfortable when the engine start is delayed, the K0 packing command value Sk0$pk$ is set to the second hydraulic pressure PR2, and the starting responsiveness is easily improved.

Further, according to the present embodiment, the first situation ST1 is when the engine 12 is started in cooperation with another control other than the control for starting the engine 12. Thus, when the engine 12 is started while the starting shock is likely to occur, the K0 packing command value Sk0*pk* is set to the first hydraulic pressure PR1, and the starting shock is easily reduced. On the other hand, the second situation ST2 is when the engine 12 is started without coordinating with another control other than the control for starting the engine 12. Thus, when the engine 12 is started while the starting shock is unlikely to occur, the K0 packing command value Sk0*pk* is set to the second hydraulic pressure PR2, and the starting responsiveness is easily improved.

Further, according to the present embodiment, the second situation ST2 is when the timing of the first combustion when the engine 12 is started is earlier than that in the first situation ST1. Thus, when the engine 12 is started with advanced timing of the first combustion to improve the responsiveness, the K0 packing command value Sk0*pk* is set to the second hydraulic pressure PR2, and the starting responsiveness is easily improved.

Although the examples of the present disclosure have been described in detail with reference to the drawings, the present disclosure also applies to other modes.

For example, in the above-described embodiment, as the first hydraulic pressure PR1, the command value of the K0 hydraulic pressure PRk0 that maintains the K0 clutch 20 in a state where the torque capacity is not generated in the K0 clutch 20 and the packing completed state is illustrated, and as the second hydraulic pressure PR2, the command value of the K0 hydraulic pressure PRk0 for cranking for the "K0 cranking" phase is illustrated. However, the present disclosure is not limited to this mode. For example, the first hydraulic pressure PR1 only needs to be a command value of the K0 hydraulic pressure PRk0 that makes it easier to reduce the starting shock, and the second hydraulic pressure PR2 only needs to be a command value of the K0 hydraulic pressure PRk0 higher than that of the first hydraulic pressure PR1, which makes it easier to improve the starting responsiveness.

Further, in the above-described embodiment, as a starting method of the engine 12, a starting method in which the engine 12 is ignited in accordance with the cranking of the engine 12 during the transition where the K0 clutch 20 is switched from the released state to the engaged state, and the engine rotation speed Ne is increased in the engine 12 itself has been illustrated. However, the present disclosure is not limited to this mode. For example, the starting method of the engine 12 may be a starting method of igniting the engine 12 after cranking the engine 12 until the K0 clutch 20 is brought into a fully engaged state or a state close to a fully engaged state, or the like. When the vehicle 10 is stopped while the MG rotation speed Nm is set to zero, a starting method can be adopted in which the engine 12 is ignited after cranking the engine 12 by the electric motor MG in the fully engaged state of the K0 clutch 20. Further, when the vehicle 10 is equipped with a starter which is a dedicated motor for cranking the engine 12, for example, a starting method can be adopted in which the engine 12 is ignited after cranking the engine 12 with the starter, when the vehicle 10 is stopped while the MG rotation speed Nm is set to zero and the cranking by the electric motor MG cannot be sufficiently performed or is impossible due to extremely low outside air temperature.

Further, in the above-described embodiment, the planetary gear automatic transmission that constitutes a part of the power transmission path between the engine 12 and the drive wheels 14, and that functions as the automatic transmission 24 that transmits the drive force from each of the driving force sources (engine 12, electric motor MG) to the drive wheels 14 is illustrated. However, the present disclosure is not limited to this mode. The automatic transmission 24 may be a known synchronous meshing parallel two-axis automatic transmission including a dual clutch transmission (DCT), a known belt-type continuously variable transmission, or the like.

Further, in the above-described embodiment, the torque converter 22 is used as the fluid transmission device, but the present disclosure is not limited to this mode. For example, as the fluid transmission device, another fluid transmission device such as a fluid coupling having no torque amplification function may be used instead of the torque converter 22. Alternatively, the fluid transmission device does not necessarily have to be provided.

It should be noted that the embodiment described above is merely one embodiment, and the present disclosure can be implemented in a mode in which various changes and improvements are made based on the knowledge of those skilled in the art.

What is claimed is:

1. A control device for a vehicle including an engine, an electric motor connected to a power transmission path between the engine and drive wheels so as to be able to transmit power, a clutch provided between the engine and the electric motor in the power transmission path, a control state of the clutch configured to be switched by controlling a hydraulic clutch actuator, and a hydraulic control circuit system that supplies adjusted hydraulic pressure to the clutch actuator, the control device comprising:
   an electronic control unit configured to:
      output a first command value to the hydraulic control circuit system prior to output of a second command value to the hydraulic control circuit system during a transition of switching the control state of the clutch from a released state to an engaged state when the engine is started, the second command value being a command value for supplying the hydraulic pressure to the clutch actuator such that the clutch transmits cranking torque that raises a rotation speed of the engine, and the first command value being a command value for supplying the hydraulic pressure to the clutch actuator such that a pack clearance of the clutch is tightened;
      perform, when the engine is started, first control for outputting the cranking torque by the electric motor and second control for starting operation of the engine;
      set the first command value to a first hydraulic pressure when the engine is started in a first situation; and
      set the first command value to a second hydraulic pressure higher than the first hydraulic pressure when the engine is started in a second situation, wherein:
      the first situation is when a start of the engine is requested due to a cause other than a driving operation of a driver; and
      the second situation is when the start of the engine is requested due to an increase in a drive request amount for the vehicle by the driver.

2. The control device according to claim 1, wherein:
   the first hydraulic pressure is a command value that maintains the clutch in a state where a torque capacity is not generated in the clutch and the pack clearance is tightened; and
   the second hydraulic pressure is the second command value.

3. The control device according to claim 1, wherein when the start of the engine is requested due to the cause other than the driving operation of the driver is when the start of the engine is requested due to a request made to charge a power storage device with electric power generated by the electric motor using power of the engine, the power storage device being provided in the vehicle and being configured to transmit and receive the electric power to and from the electric motor.

4. The control device according to claim 1, wherein when the start of the engine is requested due to the cause other than the driving operation of the driver is when the start of the engine is requested due to a request to warm up the engine.

5. The control device according to claim 1, wherein when the start of the engine is requested due to the cause other than the driving operation of the driver is when the start of the engine is requested during driving support control for driving the vehicle by automatically performing at least acceleration and deceleration.

6. A control device for a vehicle including an engine, an electric motor connected to a power transmission path between the engine and drive wheels so as to be able to transmit power, a clutch provided between the engine and the electric motor in the power transmission path, a control state of the clutch configured to be switched by controlling a hydraulic clutch actuator, and a hydraulic control circuit system that supplies adjusted hydraulic pressure to the clutch actuator, the control device comprising:
an electronic control unit configured to:
output a first command value to the hydraulic control circuit system prior to output of a second command value to the hydraulic control circuit system during a transition of switching the control state of the clutch from a released state to an engaged state when the engine is started, the second command value being a command value for supplying the hydraulic pressure to the clutch actuator such that the clutch transmits cranking torque that raises a rotation speed of the engine, and the first command value being a command value for supplying the hydraulic pressure to the clutch actuator such that a pack clearance of the clutch is tightened;
perform, when the engine is started, first control for outputting the cranking torque by the electric motor and second control for starting operation of the engine;
set the first command value to a first hydraulic pressure when the engine is started in a first situation; and
set the first command value to a second hydraulic pressure higher than the first hydraulic pressure when the engine is started in a second situation, wherein:
the first situation is when a start of the engine is requested during driving support control for driving the vehicle by automatically performing at least acceleration and deceleration; and
the second situation is when the start of the engine is requested due to an increase in a drive request amount for the vehicle during manual driving control for driving the vehicle based on a driving operation of a driver.

7. A control device for a vehicle including an engine, an electric motor connected to a power transmission path between the engine and drive wheels so as to be able to transmit power, a clutch provided between the engine and the electric motor in the power transmission path, a control state of the clutch configured to be switched by controlling a hydraulic clutch actuator, and a hydraulic control circuit system that supplies adjusted hydraulic pressure to the clutch actuator, the control device comprising:
an electronic control unit configured to:
output a first command value to the hydraulic control circuit system prior to output of a second command value to the hydraulic control circuit system during a transition of switching the control state of the clutch from a released state to an engaged state when the engine is started, the second command value being a command value for supplying the hydraulic pressure to the clutch actuator such that the clutch transmits cranking torque that raises a rotation speed of the engine, and the first command value being a command value for supplying the hydraulic pressure to the clutch actuator such that a pack clearance of the clutch is tightened;
perform, when the engine is started, first control for outputting the cranking torque by the electric motor and second control for starting operation of the engine;
set the first command value to a first hydraulic pressure when the engine is started in a first situation; and
set the first command value to a second hydraulic pressure higher than the first hydraulic pressure when the engine is started in a second situation, wherein:
the first situation is when the engine is started in cooperation with another control other than control for starting the engine; and
the second situation is when the engine is started without coordinating with the other control.

8. The control device according to claim 1, wherein the second situation is a situation in which a timing of a first combustion in a start of the engine is earlier than a timing of a first combustion in a start of the engine in the first situation.

9. The control device according to claim 6, wherein the second situation is a situation in which a timing of a first combustion in a start of the engine is earlier than a timing of a first combustion in a start of the engine in the first situation.

10. The control device according to claim 7, wherein the second situation is a situation in which a timing of a first combustion in a start of the engine is earlier than a timing of a first combustion in a start of the engine in the first situation.

* * * * *